United States Patent [19]

Sara

[11] Patent Number: 4,567,103
[45] Date of Patent: Jan. 28, 1986

[54] CARBONACEOUS ARTICLES HAVING OXIDATION PROHIBITIVE COATINGS THEREON

[75] Inventor: Raymond V. Sara, Parma, Ohio

[73] Assignee: Union Carbide Corporation, Danbury, Conn.

[21] Appl. No.: 628,516

[22] Filed: Jul. 12, 1984

Related U.S. Application Data

[63] Continuation-in-part of Ser. No. 518,192, Jul. 28, 1983, abandoned.

[51] Int. Cl.$^4$ ............................ B32B 9/00; B05D 3/02; B05D 5/12
[52] U.S. Cl. ...................................... 428/408; 106/74; 313/355; 427/113; 427/374.2; 427/376.2; 427/379; 427/397.8; 428/698; 501/128
[58] Field of Search ............. 313/355; 427/113, 376.2, 427/380, 379, 397.8, 374.2; 428/367, 408, 689, 698; 501/5, 95, 128; 106/74, 75, 84

[56] References Cited

U.S. PATENT DOCUMENTS

| | | | |
|---|---|---|---|
| 3,140,193 | 7/1964 | Kane | 117/8 |
| 3,348,929 | 10/1967 | Valtschev et al. | 29/180 |
| 3,852,107 | 12/1974 | Corkin et al. | 117/228 |
| 4,301,387 | 11/1981 | Schiffarth et al. | 313/355 |
| 4,378,410 | 3/1983 | Bailey | 428/448 |
| 4,384,046 | 5/1983 | Nakagami | 501/95 |

FOREIGN PATENT DOCUMENTS

| | | |
|---|---|---|
| 316450 | 11/1919 | Fed. Rep. of Germany . |
| 10614 | 4/1970 | Japan . |
| 26597 | 8/1973 | Japan . |
| 26308 | 3/1974 | Japan . |
| 29283 | 8/1974 | Japan . |
| 48341 | 12/1977 | Japan . |
| 18525 | 6/1978 | Japan . |
| 47712 | 8/1979 | Japan . |
| 27155 | 7/1980 | Japan . |
| 41782 | 3/1983 | Japan . |
| 894593 | 4/1962 | United Kingdom . |
| 955629 | 4/1964 | United Kingdom . |
| 1026055 | 4/1966 | United Kingdom . |
| 1166429 | 10/1969 | United Kingdom . |

*Primary Examiner*—Michael R. Lusignan
*Attorney, Agent, or Firm*—John R. Doherty

[57] ABSTRACT

A carbonaceous article, e.g., a carbon or graphite electrode, is provided with an oxidation prohibitive coating comprising a compliant, low strength, porous, sintered, particulate, refractory, ceramic material. A cover layer is preferably applied over this compliant, low strength, ceramic layer, the cover layer comprising a rigid, glassy substance which is plastic and flowable at temperatures above about 750° C.

102 Claims, 10 Drawing Figures

GLASSY COVER LAYER AT ROOM TEMPERATURE

CRACK

GLASSY COVER LAYER AT 1350°C

BASE LAYER - INTERMEDIATE (1000X)

FIBERS

BASE LAYER - INTERMEDIATE (4000X)

FIBERS

BASE LAYER – ADJACENT INTERFACE (1000X)

BASE LAYER – ADJACENT INTERFACE (4000X)

CARBONACEOUS ARTICLES HAVING OXIDATION PROHIBITIVE COATINGS THEREON

This application is a continuation-in-part of my earlier filed co-pending application, Ser. No. 518,192, filed on July 28, 1983, now abandoned.

RELATED APPLICATIONS

Copending application Ser. No. 518,194 entitled "Oxidation Prohibitive Coatings for Carbonaceous Articles", filed by R. V. Sara on July 28, 1983, discloses and claims subject which is related to the present application.

TECHNICAL FIELD

The present invention relates to carbonaceous articles such as carbon or graphite electrodes, and more particularly to carbonaceous articles having oxidation prohibitive coatings thereon and to improved methods for applying such coatings onto the surfaces of carbonaceous articles. In a more specific aspect, the present invention is directed to improvements in oxidation protection of carbon or graphite electrodes at high temperatures in electric arc furnaces for making steel.

BACKGROUND ART

Carbonaceous articles are widely used today in both the chemical and metallurgical industries since they exhibit exceptional properties at high temperatures. For example, graphite electrodes are used in electric arc furnaces because they are excellent conductors of electrical current at high furnace temperatures and have good mechanical strength and excellent thermal stability.

However, a major deficiency of carbonaceous articles is that they rapidly oxidize and erode at high temperatures, e.g., above about 500° C. This problem is particularly acute in the case of graphite electrodes for electric arc furnaces. These electrodes must be periodically replaced as they oxidize and erode and this contributes significantly to the final cost of the steel.

It has been proposed to employ oxidation prohibitive coatings on the surfaces of carbonaceous articles, in particular, carbon or graphite electrodes. These protective coatings have been composed of carbides, silicides, oxides and metals, for example. The coatings have been applied to the surfaces of the article using various known methods such as by electric arc, flame spraying or vacuum heating. However, a problem with these protective coatings has been that they cannot withstand severe thermal shock. Such conditions are encountered, for example, when a coated graphite electrode is heated to elevated furnace temperature in excess of about 1200° C. and then rapidly cooled. The protective coating will crack and even spall under these severe conditions and thereby expose the graphite substrate to oxidation. This failure of the protective coating occurs primarily because the coefficient of thermal expansion of the coating does not match that of the graphite substrate or the coating is poorly bonded to the graphite. Consequently, the protective coating and graphite substrate expand and contract at different rates thereby imposing high internal stresses inside the coating and at the coating-graphite interface.

British Pat. No. 1,166,429 discloses a shaped carbon or graphite body provided with an oxidation prohibitive coating, which coating comprises a primary layer applied to the coating and a metallic surfacing layer applied to the primary layer. The primary layer consists of from 90 to 100 weight percent silicon and 0-10 weight percent of one or more of sodium, nitrogen, magnesium, calcium, boron and aluminum. The surfacing layer consists of from 85 to 100 weight percent of aluminum and a total of from 0 to 15 weight percent of one or more metals or compounds including, for example, sodium, magnesium, boron, silicon and phosphorus. Both the primary layer and metallic surfacing layer are applied to the carbon or graphite body by flame spraying techniques. The metallic surfacing layer melts or softens at about the operating temperature of the electrode and seals off any pores that may have developed in the coating during its application. However, a difficulty with this dual layer coating is that the silicon containing primary layer is difficult to apply, it is expensive and bonds to the graphite substrate with difficulty. Furthermore, the low temperature oxidation products in the coating are subject to spallation and erosion.

U.S. Pat. No. 3,140,193 to Kane discloses a graphite electrode having a dual layer protective coating of which the inner layer is made of porous silicon carbide and the outer layer is composed of silicon metal. This protective coating is subject to the same limitation in that the inner layer does not bond to the graphite.

Thus, there is a need in this industry for improved oxidation prohibitive coatings for use on carbonaceous articles, in particular, carbon or graphite electrodes, which avoid the difficulties of the prior art and provides very effective protection against oxidation even under the most severe or abusive conditions, and which is inexpensive and easily adaptable to full scale production.

SUMMARY OF THE INVENTION

In accordance with the present invention, there is provided an article comprising a carbonaceous substrate and a coating overlying and bonded to the substrate, the coating comprising a compliant, porous, low strength, particulate, sintered, ceramic refractory material. Because the ceramic refractory material is compliant and porous, the coating absorbs most of the high internal stresses that develop due to the difference in thermal expansion between the coating and the carbonaceous substrate. Furthermore, since the ceramic refractory material is of low strength, i.e., its tensile strength is less than the shear strength of the bond between the coating and the substrate, the coating is able to relieve exceptionally high internal stresses by allowing tiny microcracks to form in its structure and thereby prevent a catastrophic failure at the coating-substrate interface.

Preferably, a dual layer oxidation prohibitive coating is applied to the surfaces of the carbonaceous articles using as a primary or base layer the same compliant, porous, low strength coating described hereinabove. A cover layer overlies and is bonded to this base layer, the cover layer comprising a rigid, glassy substance which is plastic and flowable at temperatures above about 750° C.

The present invention also comprehends an improved method of protecting a carbonaceous article against oxidation and erosion at elevated temperatures, which comprises:

(a) applying to the surfaces of the carbonaceous article a particulate material containing mullite (3Al- $_2O_3.2SiO_2$), silica, aluminum and a silicon-containing binder, e.g., sodium silicate; and (b) heating the particulate material to a temperature at which the silica is reduced by the aluminum to produce aluminum oxide and silicon.

Optionally, the present method may include additional steps to form the rigid, glassy cover layer which comprise:

(c) applying to the particulate material of step (a) either before or after step (b) a second particulate material containing a glassy substance having a melting point above about 750° C.;

(d) heating the second particulate material to a sufficiently elevated temperature to melt or soften the glassy substance, and then (e) cooling the glassy substance to form the rigid, glassy cover layer.

Preferably, the first particulate material is applied to the carbonaceous article in the form of an aqueous slurry and then dried under conditions to produce a coherent layer adhering to the surfaces of the article. The second particulate material is then applied to this coherent layer also in the form of an aqueous slurry and then dried under conditions to produce a second coherent layer adhering to the first coherent layer. The coated article is then heated to elevated temperatures to simultaneously cure the coating composition in the first and second layers.

Mullite ($3Al_2O_3.2SiO_2$) is a well known ceramic material. It is widely used for many applications in the ceramic industry. Mullite is commonly produced by heating clays, feldspars, hyanites, etc., to a temperature in excess of about 1300° C. Methods for producing mullite are disclosed in U.S. Pat. Nos. 3,857,923 and 3,922,333.

BRIEF DESCRIPTION OF THE DRAWING

The present invention will now be described in greater detail with particular reference to the accompanying drawing, in which.

DESCRIPTION OF THE PREFERRED EMBODIMENTS

Figure 1:
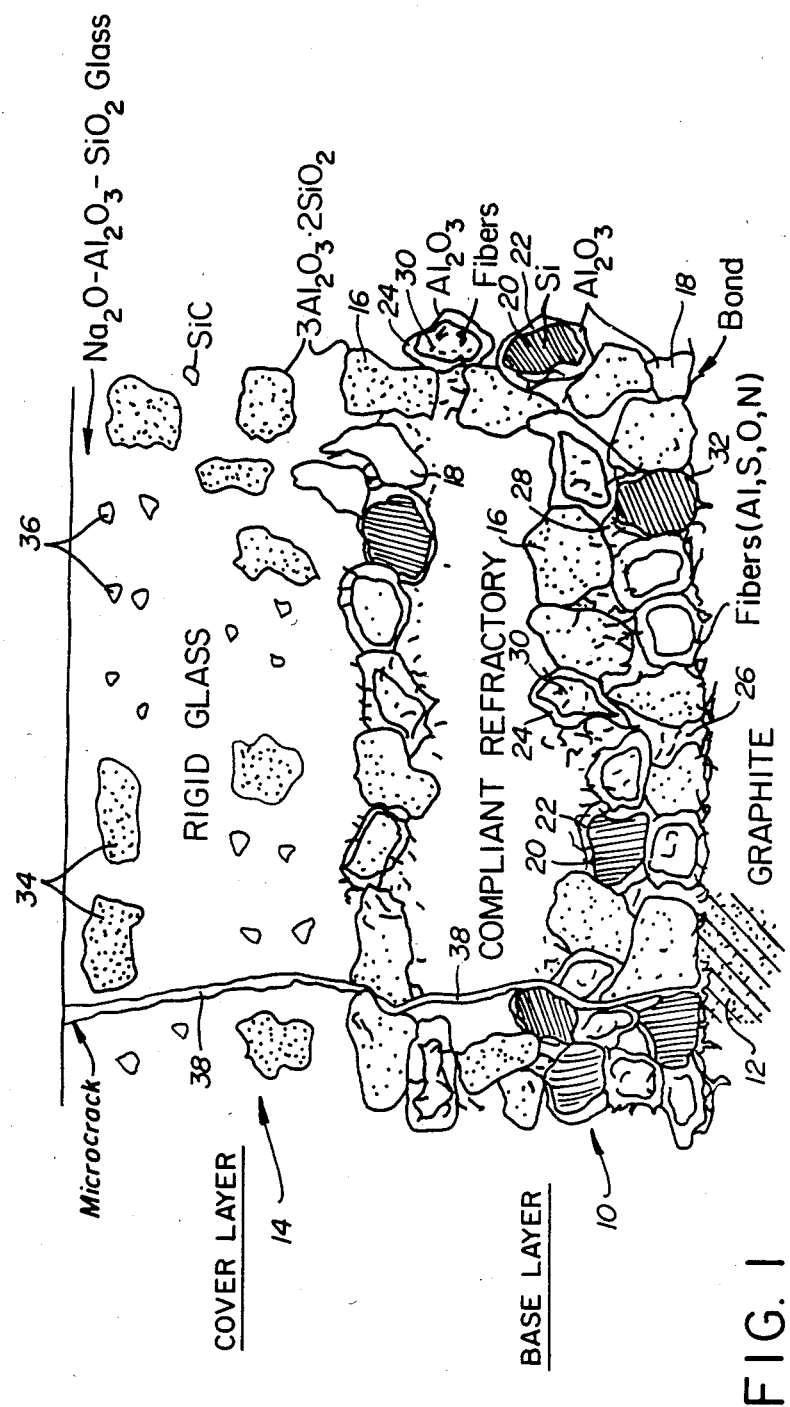
FIG. 1 is a schematic, cross-sectional view of a dual layer coating according to the present invention.

The present invention is based upon the discovery that a compliant, porous, low strength, ceramic, refractory coating can be bonded to the surface of a carbonaceous article by applying thereto a particulate material containing a mixture of mullite, silica, aluminum or aluminum alloy, and a silicon-containing binder, e.g., sodium silicate, and then heating the particulate material to an elevated temperature above about 1000° C. At these temperatures, the aluminum reacts with the silica and produces particles of aluminum oxide and silicon. The aluminum also decomposes the silicon-containing binder and results in many void spaces being formed between the particles. This contributes significantly to the porosity of the coating. Moreover, during the reaction, the particles of mullite, aluminum oxide and silicon metal become only weakly sintered to one another, thereby reducing the strength and stiffness of the coating.

It has also been unexpectedly discovered that the mullite, silica and aluminum or aluminum alloy interact at elevated temperatures to produce a unique fibrous ceramic material. The fibers are formed mainly as clusters located inside the void spaces between the particles and contribute significantly to the low stiffness and compliant properties of the coating. It has also been found that the fibers form in situ within the pores of the graphite substrate and produce a strong bond at the coating-substrate interface.

In the practice of the present invention, a coating composition may be prepared by admixing together particles of mullite, silica, aluminum or aluminum alloy and a silicon-containing binder material, e.g., sodium silicate. The coating composition may comprise between about 30 and 75% by weight mullite, between about 0 and 12% by weight silica, between about 15 and 60% by weight aluminum, and between about 5 and 11% by weight of the silicon-containing binder. A sufficient amount of water is added to the mixture to form a slurry having a consistency which will allow the coating composition to be uniformly applied to the surfaces of the carbonaceous article by brushing, spraying or the like.

The amount of aluminum in the coating composition used to form the base layer of a dual layer coating is preferably maintained within a range of between about 15 and 35% by weight of the dry mixture (e.g., mullite, silica, aluminum and solid sodium silicate). If the amount of aluminum used in the coating composition is less than this required amount, the coating will not bond to the graphite substrate and will spall upon thermal cycling at elevated temperatures. If, on the other hand, the coating composition contains a greater amount of aluminum over and above this range, then in the case of the dual layer coating, the cover layer containing silicon carbide will have a tendency to non-uniformly coat the base layer.

The particle size of the various mixture ingredients used in the coating composition is not narrowly critical. Generally, the mullite, silica and aluminum particles are kept within a range of between about 5 and 350 microns.

A commercial grade aluminum powder of predominantly −74 to +44 microns can be used, for example. The silicon-containing binder material is preferably sodium silicate, although other materials may be employed such as potassium silicate, ethyl silicate and colloidal silica. The sodium silicate can be employed either as a dry powder or a liquid, e.g., waterglass.

The slurry may be applied to the carbonaceous article using conventional methods such as by brushing or spraying. Care should be taken to cover all of the surfaces to be protected with a relatively thick, moist, uniform particulate layer. The applied layer is then dried to remove water and produce a coherent layer which adheres to the surface of the article. The layer may be dried suitably at room or ambient temperature for about one or two hours. The layer may also be dried under accelerated conditions at moderately elevated temperatures in a drying oven, for example. If necessary, a second application of the slurry may be applied in the same manner to the dried, first applied layer in order to build up the thickness of the base layer. Preferably, the thickness of the dry layer is in the range of between about 0.020 and 0.100 inch.

After drying has been complete, the coated article may if desired be heated to elevated temperatures in excess of about 1000° C. in order to cure the composition and produce a single layer coating according to the present invention. This single layer coating will ordinarily provide good protection for the carbonaceous article under moderate oxidizing conditions. However, in order to provide optimum oxidation protection, it is preferred to employ a dual layer coating on the surfaces of the carbonaceous article. This dual layer coating is achieved by applying to the base layer, after drying, a cover layer composed of a rigid, glassy substance having a melting point preferably as low as 750° C. At these temperatures, the glassy cover layer is plastic and flowable and seals off any microcracks that may develop in the base layer upon thermal cycling. At the same time, the base layer has a low modulus and is compliant due to the porosity and weakly sintered bond between the particles. As a result, the base layer is able to absorb high internal stresses that develop due to the difference in thermal expansion between the coating and the graphite substrate. Moreover, the tensile strength of the base layer is considerably less than the shear strength of the interfacial bond between the base layer and the graphite. Consequently, the base layer is of low strength relative to the bond and when exceptionally high stresses develop, the base layer will usually fail in tension by forming microcracks before the coating debonds or fails at the interface. Any microcracks that occur in the base layer will eventually be sealed by the glassy cover layer when heated again to elevated temperatures.

A number of different glassy substances may be used to prepare the cover layer according to the present invention. For example, the cover layer may be made from another coating composition prepared by admixing together particles of mullite, silica, silicon carbide or boron carbide or both and a silicon-containing binder material, e.g., sodium silicate. The coating composition may comprise between about 0 and 70% by weight mullite, between about 0 and 14% by weight silica, between about 5 and 95% by weight of the metallic carbide and between about 5 and 14% by weight of the silicon-containing binder. Preferably, silicon carbide is employed as the metallic carbide in the coating composition. As before, a sufficient amount of water is added to the mixture to form a slurry having a consistency which will allow the coating composition to be uniformly applied to the dried surfaces of the base layer by brushing, spraying or the like.

The silicon carbide or boron carbide used in this coating composition should be employed in an amount of at least about 5% by weight of the mixture. If a lesser amount of the metallic carbide is used, then the glassy cover layer tends to be flaky and does not adhere well to the base layer.

The particle size of the mixture ingredients used in this coating composition can also be varied but preferably should be kept within a range of between about 5 and 350 microns, for example. The silicon carbide particles may be a commercial grade SiC powder which are less than 74 microns. The silicon-containing binder material is again preferably sodium silicate, although other materials such as potassium silicate, ethyl silicate or colloidal silica may also be used. The sodium silicate can be used as a dry powder or liquid, e.g., waterglass.

The slurry is applied to the surfaces of the dried but uncured base layer also using conventional methods such as by brushing or spraying. Care is again taken to cover all of the surfaces of the base layer with a relatively thick, moist, uniform, particulate layer. This layer is then dried to remove water and produce a hard coherent layer adhering to the base layer. The layer may be dried at room or, ambient temperature or alternatively, at moderately elevated temperatures in a drying oven. Again, if necessary, a second application of the slurry may be applied to the dried first layer in order to build up its thickness. Preferably, the thickness of the dry cover layer should be kept within the range of between about 0.010 and 0.050 inch.

The dual layer coated article is then heated to elevated temperatures above about 1000° C. in order to simultaneously cure the base and glassy cover layers. Optionally, the base layer can be cured prior to the application and subsequent curing of the cover layer. The two layers chemically bond to one another and adhere very well. When sodium silicate is used as the binder, it is decomposed by aluminum in the base layer and most of the sodium migrates to the cover layer where it acts as a glass former.

The rigid, glassy cover layer prepared in the manner as described above has a melting point above about 1100° C. which is satisfactory in many applications. However, in certain applications such as furnace electrodes, it is desirable to provide a glassy cover layer having a melting point which is significantly lower, e.g. about 750° C. In the case of furnace electrodes, for example, it has been discovered that when the electrodes are cycled and rapidly cooled, the carbonaceous substrate may be exposed to oxidation through the many tiny microcracks that develop in the coating due to thermal stress. These tiny microcracks are sealed off to prevent oxidation only when the glassy cover layer is rendered plastic and flowable upon reaching its melting point. If the melting point of the cover layer is too high, then oxidation protection cannot be afforded during the early stages of the next cycle when the electrode is heated up again to steel-making temperatures.

A rigid, glassy cover layer having a significantly lower melting point can be prepared by employing in the coating a boron-containing compound such as, for example, an oxide of boron, e.g. $B_2O_3$. A glass frit such as a borosilicate frit is an excellent choice for this purpose. Borosilicate frits contain $Na_2O$, $B_2O_3$ and $SiO_2$ as the principal ingredients. (G. W. Morey in J. Soc. Glass Tech., 35, 270 (1951), discloses a phase diagram of the $Na_2O$—$B_2O_3$—$SiO_2$ system.) Other oxides found in these borosilicate frits include CaO, MgO and $Al_2O_3$. A variety of borosilicate frits are commercially available. Frit No. 3227 produced by Ferro Corp. has been used with success in the practice of the present invention.

It has been found that in order to obtain a glassy cover layer having a sufficiently low melting point for use in coating furnance electrodes, the borosilicate frit should have the following composition: from about 7 to about 52 wt. % $Na_2O$, from about 8 to about 64 wt. % $B_2O_3$ and from about 6 to about 68 wt. % $SiO_2$. The melting point of these borosilicate frits is typically from about 700° to 900° C.

The cover layer may be prepared from a particulate mixture containing the borosilicate frit and silicon-containing binder material e.g. sodium silicate, in the same manner as described above. A slurry containing the finely divided borosilicate (e.g. about 200 microns) and binder is prepared and applied in a relatively thick layer. The applied layer is dried and cured at elevated temperatures above about 700° C.

A filler material may also be employed in the particulate mixture if desired. The filler thickens the mixture and provides the proper viscosity. Most any refractory filler material may be used so long as the filler is compatible with the other ingredients of the coating. Suitable filler materials include, for example, $Al_2O_3$, SiC mullite, $SiO_2$ and $B_4C$.

The amount of borosilicate frit, binder and filler material employed in the particulate mixture is not narrowly critical. However, it has been found that good results are obtained when the mixture ingredients are maintain within the following ranges: from about 25 to about 85 wt. % borosilicate, from about 5 to about 15 wt. % silicon-containing binder and from about 0 to about 65% filler material.

The particulate mixture containing the borosilicate frit and binder may be applied to the base layer after drying as described before or it may be applied as an additional outer layer over a dual layer coating prepared in the same manner as described hereinabove. In this instance, a multiple layer coating system is provided with the layer containing the metallic carbide (e.g. silicon carbide) particles serving an intermediate layer.

FIG. 1 shows schematically a carbonaceous article provided with a dual layer oxidation prohibitive coating according to the present invention. As shown, the coating comprises a base layer 10 of refractory material overlying and bonded to the graphite substrate 12 and a rigid, glassy cover layer 14. The base layer 10 is composed of a uniform mixture of loosely bonded mullite particles 16, aluminum oxide particles 18, and particles of silicon metal 20. Each particle of silicon 20 is surrounded by a body of aluminum oxide as shown at 22.

The base layer 10 also includes spherical, hollow shell-like particles 24 composed of aluminum oxide. The particles of mullite, aluminum oxide and silicon are weakly sintered to one another and have many void spaces interposed between the particles as at 26. Fibers of a ceramic refractory material 28 are disposed in clusters inside the void spaces and also inside some of the aluminum oxide shells as shown at 30.

The base layer 10 is held tenaciously onto the graphite substrate 12 by an interfacial bond 32. This bond is composed mainly of fibers of refractory ceramic material 28. As shall be described hereinafter in greater detail, the fibers 28 are widely distributed in random orientation throughout the pores of the graphite located just inside the area of the interfacial bond.

The cover layer 14 of the coating is composed of a rigid, glassy substance which, in this case, has substantially uniformily distributed therein particles of mullite 34 and silicon carbide 36. The cover layer 14 is chemically bonded to the base layer 10 and is plastic and flowable at temperatures in excess of about 1100° C.

The dual layer coating described hereinabove is able to withstand severe thermal shock. A graphite electrode protected by the dual layer coating can be employed at temperatures above 1400° C. and under conditions of repeated thermal cycling without the coating losing its protective capabilities through melting or spalling.

Both the rigid, glassy cover layer 14 and the base layer 12 have a coefficient of thermal expansion (CTE) which is greater than that of the graphite substrate 12. Despite this difference in CTE, the dual layer coating withstands high shear stresses that occur in both layers and also at the coating-graphite interface without failure. If exceptionally high stresses develop, they are relieved by the formation of tiny microcracks as at 38. These microcracks originate at the glassy layer 14 and propagate through the coating in a direction toward the graphite substrate 12. This phenomenon occurs due to the fact that both layers possess a tensile strength which is considerably less than the shear strength of the interfacial bond 32.

Figure 2:
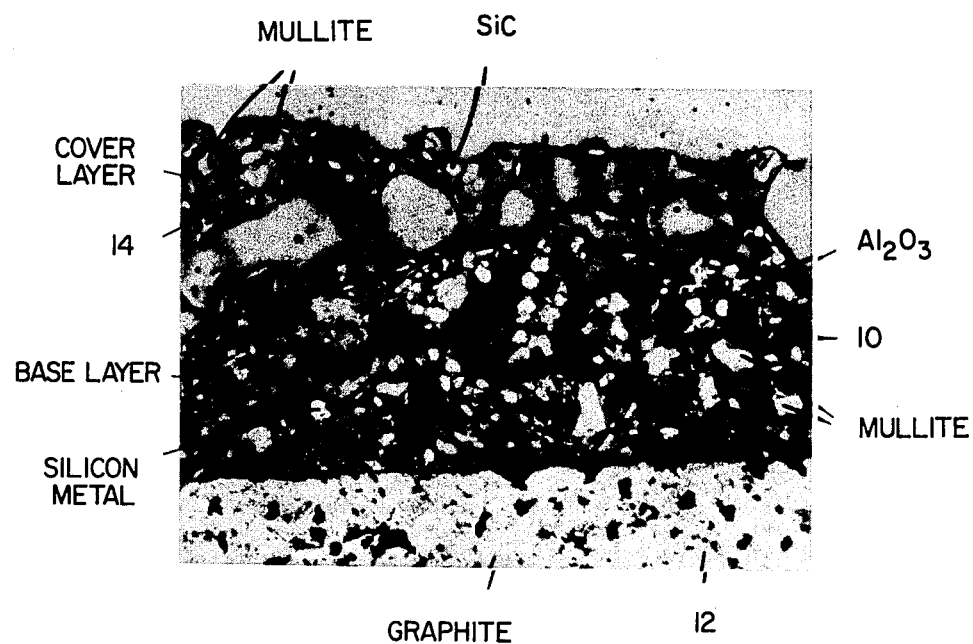
FIG. 2 is a photomicrograph taken at a magnification of 50× and showing a cross section of an actual dual layer coating according to the present invention.

FIG. 2 is a photomicrograph of an actual dual layer coated graphite article according to the present invention. The photomicrograph was taken at a magnification of 50× and shows the particles of mullite, aluminum oxide, silicon carbide, and silicon metal in the base and cover layers of the coating.

The coated article shown in FIG. 2 was mounted in an epoxy potting resin using standard metallographic techniques. The darkest areas shown in the photomicrograph are void spaces which were inaccessible to the potting resin, whereas the lighter areas appearing closest to the outer surface are pores filled with the resin. The same representations will apply, of course, in all the photomicrographs to be hereinafter discussed, unless otherwise indicated.

Figure 3:
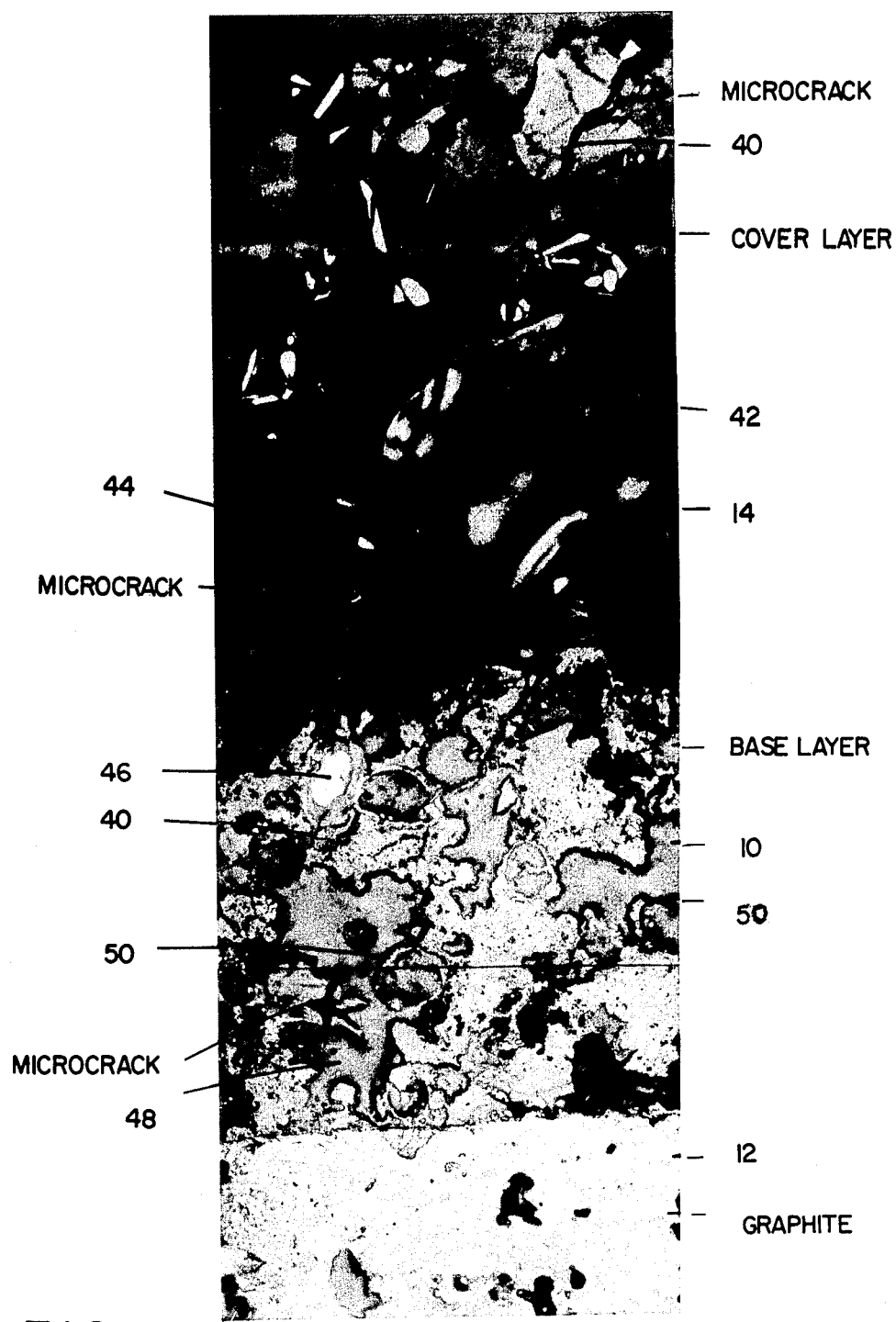
FIG. 3 is a photomicrograph taken at a magnification of 200× and showing a cross section of the same dual layer coating shown in FIG. 2.

FIG. 3 is a photomicrograph of another dual layer coated graphite article according to the present invention taken at a magnification of 200×. The cover layer in this coating contains silicon carbide. The coating shown in this photomicrograph contains a microcrack 40 originating at the surface of the cover layer and propagating downwardly through both layers in a direction toward the graphite substrate. It will be noted that the microcrack extends through a large bubble or void 42 and mullite particle 44 in the cover layer 14. The microcrack also extends around a large silicon metal particle 46 in the base layer. The crack terminates in a large void 48 just above the graphite substrate. Also shown in this photomicrograph are several aluminum oxide shells as at 50. The absence of any continuous voids at the interface in this specimen shows that the coating and graphite are well bonded.

Figure 4:
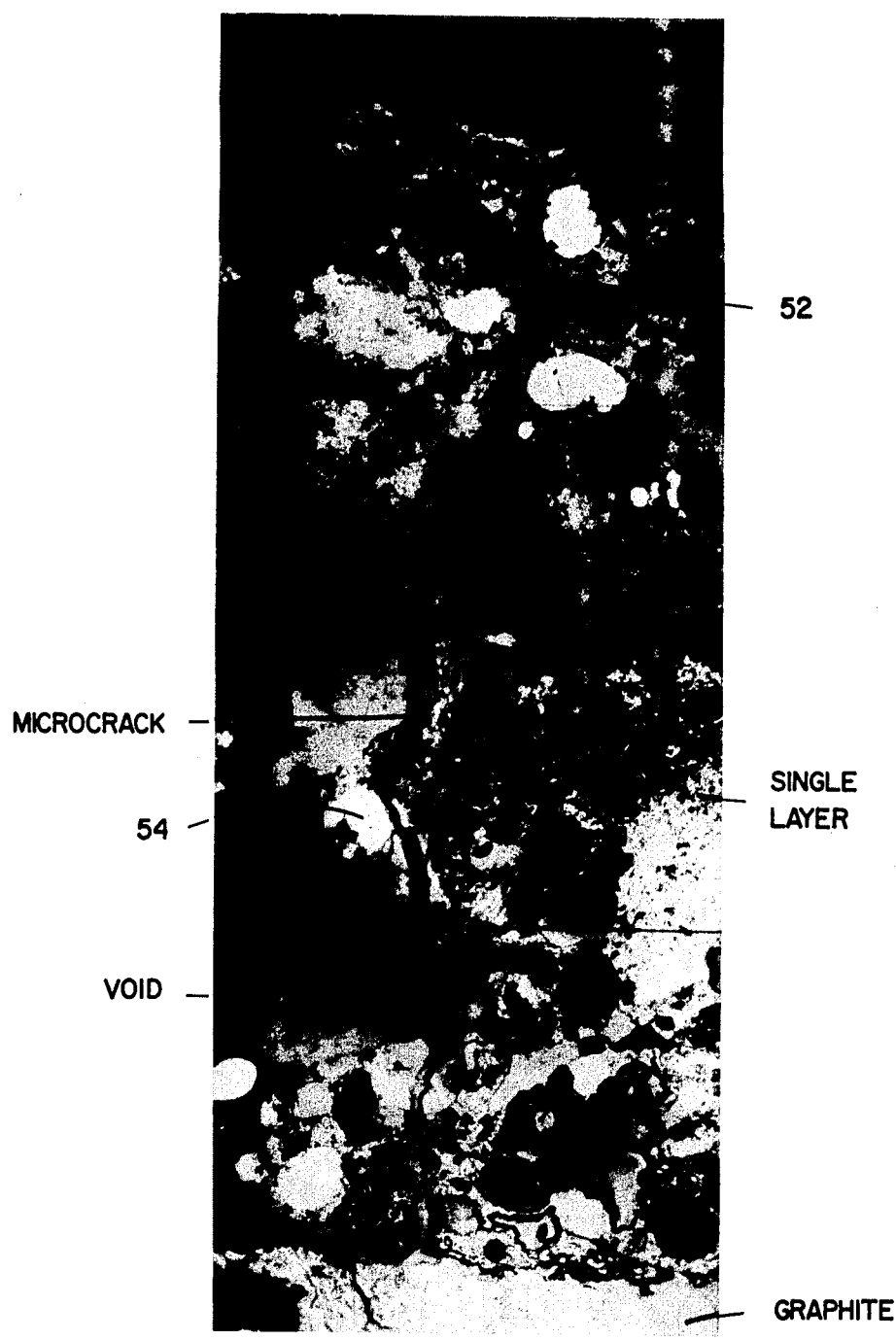
FIG. 4 is a photomicrograph similar to FIG. 3 taken at a magnification of 200× and showing a cross section of a single layer coating according to the present invention.

FIG. 4 is a photomicrograph of another coated graphite article taken again at a magnification of 200× but in this instance the coating comprises a single layer of refractory material. As will be seen, this coating contains a microcrack 52 which extends completely through the single layer and actually terminates at the interface between the coating and graphite substrate. It will also be seen in this specimen that the microcrack extends through several voids and a particle of silicon metal 54.

The single layer coating of the present invention is most advantageously used in those applications where the coated article will not be subjected to the abusive conditions of thermal cycling. Such applications would include, for example, coated refractory brick for furnace linings and the like.

Figure 5:
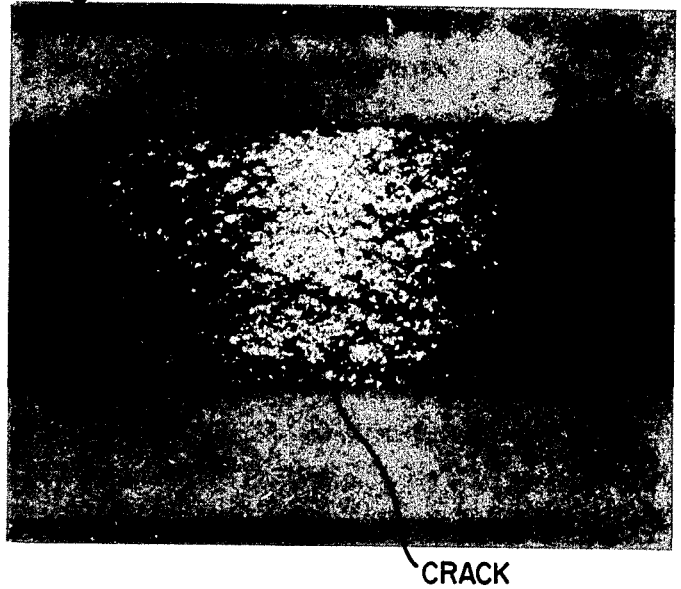
FIG. 5 is a photograph showing a top plan view of an actual glassy cover layer including a crack at room temperature.
Figure 6:
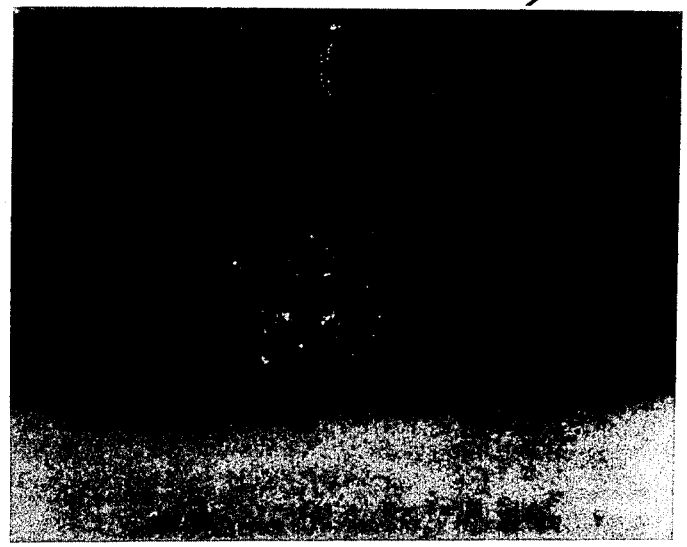
FIG. 6 is a photograph showing a top plan view of the same glassy cover layer after being heated to a temperature of 1350° C.

FIGS. 5 and 6 illustrate the self-sealing feature of a dual layer coating according to the present invention as particularly described in Example 1, hereinafter. The two photographs show a sample glassy layer that had been cut from a coated article heated to a temperature of 1350° C. The coated article was the same sample prepared in Example 1. The coating includes a cover layer containing silicon carbide particles. The sample was broken mechanically to form a large tensile crack and then reheated to 1300° C. The tensile crack was produced by loading the coated graphite sample, $\frac{1}{2}''\times\frac{1}{2}''\times1\frac{1}{2}''$, in a three point flexure mode with the coated surface down. This positioning places the coating in tension. The load was increased until a crack developed through the coating and propagated partially into the graphite. An examination of the failed sample showed the coating to have retained excellent bonding to the graphite.

The tensile crack was considerably larger in size than a typical microcrack developed in the glassy layer upon thermal shock. The photograph of FIG. 5 shows the sample at room temperature with the crack extending across the entire width of the sample. FIG. 6 shows the same sample heated to a temperature of 1350° C. It will be seen in the second photograph that the crack has sealed and a substantially smooth glassy layer remains. Some small spherical surface voids in the layer are shown as darkened spots.

Figure 7:
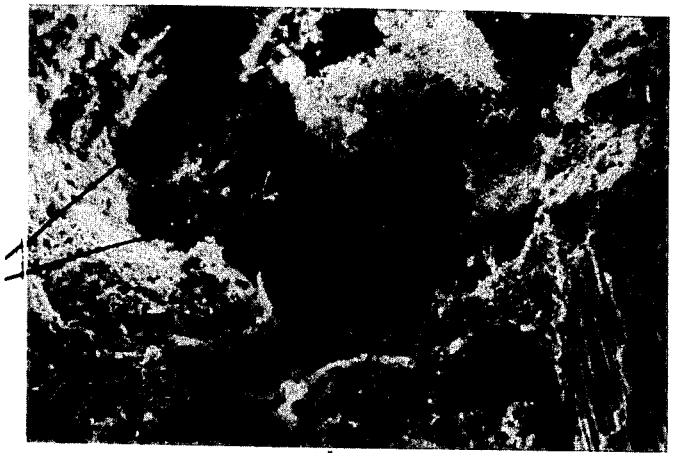
FIG. 7 is a photomicrograph taken at a magnification of 1000× and showing an intermediate section of the base layer employed in a dual layer coating according to the present invention.
Figure 8:
FIG. 8 is a photomicrograph taken at a magnification of 4000× and showing in greater detail the same section of the base layer as shown in FIG. 7.

FIG. 7 is a photomicrograph of a fracture sample taken from a dual layer coating according to the present invention. The photomicrograph shows a part of the sample located at an intermediate section of the base layer and was taken at a magnification of 1000×. As shown in the photomicrograph, the base layer contains many relatively large size, irregularly shaped pores as indicated by the darkened areas. It will also be seen that inside the pores there are formed many elongated refractory fibers. These fibers appear to grow in clusters around and between the particles. The clusters of fibers are more clearly evident in the photomicrograph of FIG. 8. This is an enlargement of the same photomicrograph at 4000×.

Figure 9:
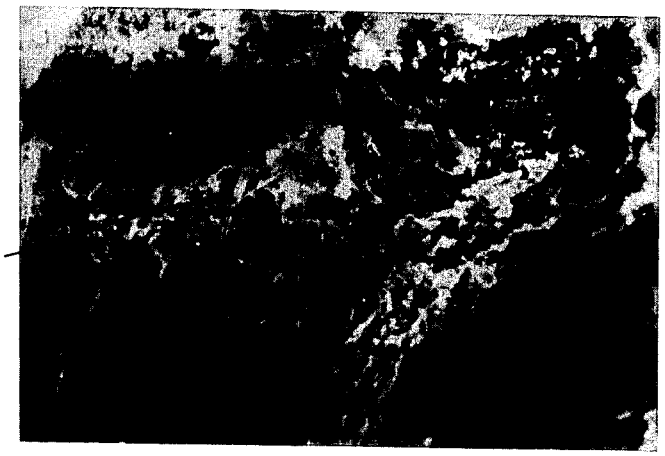
FIG. 9 is a photomicrograph taken at a magnification of 1000× and showing a section of the base layer adjacent to the interface between the base layer and graphite substrate.
Figure 10:
FIG. 10 is a photomicrograph taken at a magnification of 4000× and showing in greater detail the same section of the base layer as shown in FIG. 9.

FIGS. 9 and 10 are photomicrographs of a similar fracture sample taken from a dual layer coating according to the present invention. The photomicrographs in this case show a part of the sample located at a section of the base layer adjacent to the interface and were taken at magnifications of 1000× and 4000×, respectively. As shown in the photomicrographs, this section of the base layer, located adjacent to the graphite interface, contains fewer pores and the pores are much smaller in size. It will also be seen that many elongated, refractory fibers are formed in this section and that the fibers are similar in appearance except that some fibers are straight or more needle-like, for example. The coatings shown in FIGS. 7-10, inclusive, were also prepared with cover layers containing silicon carbide particles.

Analytical studies have been conducted in an effort to determine the exact nature of the interfacial bond between the graphite substrate and the dual layer coating. It was surprisingly found in these studies that this bond is predominantly mechanical as opposed to a chemical bond, although the possibility of the latter has not been definitely excluded. It is believed that many, tiny, microscopic, refractory fibers are formed inside the pores of the graphite structure just beneath the interface and produce the mechanical bond referred to above. The fibers appear to form in-situ during the coating reaction at elevated temperatures.

It has been furthermore discovered by electron microscopy studies that the individual fibers contain elemental aluminum, silicon, nitrogen and oxygen. In fact, recent X-ray diffraction analyses confirm these studies and suggest the presence of a nitrous aluminosilcate compound, specifically, $Al_8Si_9N_{12}O_{12}$.

The analytical studies were made using various standard techniques, i.e., Scanning Electron Microscopy (SEM); Energy Dispersive X-ray Analysis (EDX); and Auger Electron Spectroscopy (AES). These studies were conducted by using samples produced according to Example 1 hereinafter. For purposes of these studies, the dual layer coating was separated into various zones, i.e., Zone I, II, III, etc., and each Zone independently analyzed. Zone I was the rigid glass cover layer made with silicon carbide particles, Zone II the intermediate or base layer, and Zone III was the graphite substrate. Three additional Zones were analyzed, these being ZoneI/II between the rigid glassy layer and the base layer, Zone II/III (A) within the base layer adjacent to the base layer-graphite interface, and finally, Zone II/III (B) within the graphite substrate adjacent to the interface. The results of these analyses are tabulated in Table I.

TABLE I

ELEMENTAL COMPOSITION OF DUAL LAYER CERAMIC COATING-ON-GRAPHITE

| Zone | Analytical Technique | Beam Diameter | C | O | Si | N | Na | Fe | Al | P | S | Ti | Comments |
|---|---|---|---|---|---|---|---|---|---|---|---|---|---|
| I | SEM/EDX | ~5μ | X | X | X |  | X |  | X |  |  |  | "glassy" outermost coating |
| I | AES |  |  |  |  |  |  |  |  |  |  |  | Not Performed Charging Encountered |
| I/II | SEM/EDX | 5μ | X | X | X |  | X↓ |  | X |  |  |  | ↓ indicates only minor Na detected |
| II | SEM/EDX | 5μ | X | X | X |  |  |  | X |  |  |  |  |
| II/III (A) | SEM/EDX | 5μ | X | X | X | X↑ |  | X | X | X | X↓ | X↓ | II/III (A) favors the coating side of "interface" i.e. ~2-5 μm into the coating relative to |
|  | AES | 20-50Å | X | X | X | X↑ |  | X | X | X | X↓ |  |  |

TABLE I-continued
ELEMENTAL COMPOSITION OF DUAL LAYER CERAMIC COATING-ON-GRAPHITE

| Zone | Analytical Technique | Beam Diameter | C | O | Si | N | Na | Fe | Al | P | S | Ti | Comments |
|---|---|---|---|---|---|---|---|---|---|---|---|---|---|
| | | | | | | | | | | | | | the graphite. Note: N ↑ major particularly in fibers. Spherical impurities contain major Fe and minor Ti. |
| II/III (B) | SEM/EDX | 5μ | X↑ | X↓ | X↓ | X↓ | | | X↓ | | | | II/III (B) favors graphite side of "interface". At times Fe was detected by AES in discrete particles on the graphite side of the "interface". |
| | AES | 20–50Å | X↑ | X↓ | X↓ | X↓ | | | X↓ | | | | |
| III (graphite) | SEM/EDX | 5μ | X↑ | | | | | | | | | | Trace Si and O found by AES near an edge of fragmented graphite zones. |
| | AES | 20–50▽ | X↑ | X↓ | X↓ | | | | | | | | |

The analytical results tabulated in Table I confirm that the rigid, glassy cover layer is composed predominantly of oxides of aluminum, sodium and silicon along with silicon carbide. It is interesting to note from the Table that Zone I, i.e., the glassy layer, is rich in sodium and that none was found in Zone II. Most of the sodium from the preferred silicate binder in the base layer has migrated to Zone I where it acts as a glass former. The Zone adjacent to the interface, i.e., Zone II/III(A) was very rich in nitrogen, aluminum and silicon.

X-ray diffraction data have also been obtained on separate regions of the coating. It was found that in the first region close to the outer surface of the glassy cover layer, the structure was mostly amorphous. Crystalline phases were found in this region, however, identifiable as silicon carbide and mullite. In a second region intermediate to the glassy layer, the structure was again amorphous with the crystalline phases identifiable as silicon carbide and mullite. One or more additional phases were also found, e.g., sodium hydroxide. The third region analyzed was intermediate the base layer. This region was also found to be mostly amorphous and only weakly crystalline, i.e., mullite, silicon metal, etc. The fourth region analyzed was intermediate the base layer but adjacent to the interface with the graphite substrate. This region was found to be again mostly amorphous but with a stronger crystalline portion that was identifiable as an alpha-$Al_2O_3$, graphite and mullite. A pattern which could be identified as $Al_8Si_9N_{12}O_{12}$ was also found in this region.

The physical properties of a dual layer coating according to the present invention have also been investigated. It has been found, for instance, that the modulus of elasticity of the base layer is $5.9 \times 10^6$ pounds per square inch as determined by ASTM C-747 method, while that of the cover layer containing silicon carbide particles was estimated to be about $8 \times 10^6$ pounds per square inch. The estimate is based on literature references that show glasses of this general type to have a modulus of about $10 \times 10^6$ pounds per square inch when fully dense. Since this cover layer has porosity, its modulus would be somewhat lower. It has also been found that the flexural strength of the base layer is about 2500 pounds per square inch. The coefficient of thermal expansion of the base layer is about $5.5 \times 10^{-6}$ inch/inch/°C., while the coefficient of thermal expansion of the glassy cover layer is about $40 \times 10^{-6}$ inch/inch/°C. By comparison, electrode grade graphite typically has a coefficient of thermal expansion less than $1.5 \times 10^{-6}$ inch/inch/°C. The significant difference between the CTE of the graphite and glassy cover layer would ordinarily result in failure of the interfacial bond without the compliant base layer.

In a more specific aspect, the present invention is directed to a coated graphite electrode for use at elevated temperatures in an electric arc furnace for making steel. During operation of the furnace, an electrical current is passed through the graphite electrode and an electric arc is established between the tip of the electrode and a molten metal bath. The electrode column is heated by the arc to elevated temperatures in excess of about 1000° C., and periodically abruptly cooled, e.g., when the column is withdrawn to tap the molten metal. A graphite electrode protected by a dual layer coating according to the present invention can be successfully operated under these conditions for substantially longer periods than uncoated graphite electrodes. This significantly reduces the cost of operating the furnace and of course that of the final product.

The present invention also provides as an article of manufacture an electric arc furnace electrode having an uncured or "green" oxidation prohibitive coating on its surface. This uncured or green coating can be applied to the graphite electrode in the same manner as described hereinabove using a coating composition containing the same ingredients in the same proportions as previously described. However, in this case, the electrode manufacturer would not bake or cure the coating at elevated temperatures before storage or shipment to the customer. The dual layer coating of the present invention is particularly well suited to such storage or shipment since the uncured, dried coating adheres well to the graphite electrode and is hard and very durable. As a precautionary measure, however, the uncured coating should not be exposed directly to the elements for prolonged periods since the coating before curing is water soluble.

The present invention also comprehends a novel and improved coating composition for use in protecting the surfaces of a carbonaceous article, e.g., a carbon or graphite electrode, against oxidation. The coating composition may be advantageously applied to the surfaces of the carbonaceous article in the form of a wet paste containing the same ingredients in the same proportions as previously described, by brushing, troweling or a similar technique. Alternatively, the coating composition may be applied to the surfaces of the carbonaceous article by spraying or dipping, for example. In this case, additional water is added to the coating as required to adjust its consistency to the desired level.

In the dual layer embodiment of the present invention, the preferred composition of the base layer, computed on a dry basis, is as follows: 48% to 58% mullite; 9% to 12% silica; 20 to 34% aluminum; and 8 to 11% sodium silicate solids. Sufficient water is added to produce the desired slurry consistency necessary for application; i.e., brushing, spraying, etc.

The preferred composition in the case of a cover layer containing silicon carbide, also computed on a dry basis, is as follows: 52 to 61% mullite; 10 to 12.0% silica; 16.0 to 27% silicon carbide; and 9 to 12% sodium silicate solids. As in the case of the base layer, water is then added in an amount to produce the desired slurry consistency.

The following examples will serve to further illustrate the practice of the present invention.

EXAMPLE 1

A slurry was prepared using a commercial refractory cement containing mullite ($3Al_2O_3.2SiO_2$) and silica ($SiO_2$) produced under the tradename "Super 3000", a product of C. E. Refractories, Combustion Engineering, Inc., Valley Forge, PA. The cement had the following composition: approximately 57.0% by weight mullite, 11.4% by weight silica, and 31.6% by weight waterglass. This composition as published by the manufacturer was calculated on the basis of a chemical analysis of the cement by ASTM C-753, which analysis comprises 52.2% by weight $Al_2O_3$, 44% by weight $SiO_2$, 0.2% $Fe_2O_3$ an 3.6% by weight alkali (as $Na_2O$). The waterglass is a 33.4% by weight solution of sodium silicate in the approximate form $Na_2O.3.8 SiO_2$. The waterglass can also be expressed as 10.6 wt. % $Na_2O.3.8SiO_2$ and 21 wt. % water, based upon the total weight of the cement.

Aluminum powder was added to the cement in an amount of about 30% by weight based on the total weight of the cement to form a slurry. The final composition of the slurry was: 43.8% by weight mullite, 8.7% by weight silica, 24.2% by weight waterglass, and 23.1% by weight aluminum. The waterglass could be expressed as 8.1% by weight $Na_2O.3.8SiO_2$ and 16.1% by weight water, based upon the total weight of the slurry. On a water-free basis, the dry ingredients had the following composition: 52.3% by weight mullite, 10.4% by weight silica, 26.7% by weight aluminum and 9.6% by weight sodium silicate solids as $Na_2O.3.8SiO_2$. The aluminum used in the slurry was a commercial aluminum powder, i.e., Grade 54 Aluminum Powder, Metco, Inc., Westbury, NY. The aluminum powders were predominantly −200/+325 mesh.

The slurry was brushed onto all but the base surface of a graphite electrode sample measuring 5 inches in diameter and 6 inches high. The slurry was allowed to dry in air at ambient temperature until the water was removed. A second application of the slurry was then brushed onto the dried first layer. The two applications of the slurry bonded extremely well to the graphite surface and had an overall dry thickness of about 0.05 inch.

A second slurry was prepared using the same refractory cement described above but, in this instance, particles of silicon carbide were added to the slurry. The silicon carbide was added in an amount of about 20% by weight based on the total weight of the cement. The second slurry had the following composition: 47.4% by weight mullite, 9.4% by weight silica, 26.1% by weight waterglass and 16.7% by weight silicon carbide. The waterglass could be expressed as 8.7% by weight $Na_2O.3.8SiO_2$ and 17.4% by weight water, based upon the total weight of the slurry. On a water-free basis, the dry ingredients had the following composition: 57.7% by weight mullite, 11.% by weight silica, 20.3% by weight silicon carbide and 10.6% by weight sodium silicate solids as $Na_2O.3.8SiO_2$. The silicon carbide was a commercial SiC powder, i.e., Grade 280 RA Silicon Carbide, Carborundum Company, Niagara Falls, NY. The silicon carbide particles were predominantly −74 microns.

This second slurry was then brushed onto the surface of the aluminum containing base layer applied to the graphite electrode and was also allowed to dry in air at ambient temperature until all the water was removed. The graphite and two layer coating had a dry weight of 3720 grams.

The coated electrode was then placed inside a Globar furnace and subjected to an oxidation test. The oxidation test consisted of heating to about 500° C. and held at this temperature for about 1 hour. The furnace temperature was then increased in three hours to about 1350° C. air was purged through the furnace at about 7.5 SCFH during the oxidation test. After 2½ hours, the coated electrode was removed from the furnace and quenched by allowing it to stand at ambient temperature. The electrode remained luminescent for about 10 to 15 minutes. There was no evidence of any puffing or formation of pinholes. The dual layer coating was inspected under a microscope at 20× magnification and no cracks could be found on its outer surface. However, many pores could be seen throughout the coating. The coating bonded extremely well to the graphite and there was no evidence of any swelling. FIGS. 2 and 3 are photomicrographs of this coating. The final weight of the coated electrode after cooling was 3700 grams. This represented a 20 gram loss or approximately 0.54 percent. An uncoated billet subjected to the same oxidation test lost approximately 11.4 percent. It will be seen therefore that the dual layer coating was effective in reducing about 90 percent of the normal oxidation loss.

EXAMPLE 2

A 5 inch diameter graphite electrode measuring about 6 inches long was coated with two applications of a slurry prepared as in Example 1 to form the base layer of a dual layer coating. However, no aluminum was added to the slurry. An outer layer was then applied using the same slurry prepared in Example 1, containing about 20% by weight of the SiC particles. The coated electrode was placed in a Globar furnace and was subjected to the same oxidation test at 1350° C. Afterwards, the coated electrode was removed from the furnace and was quenched in the same manner at ambient temperature. The electrode remained luminescent for about 10 minutes and, during cooling, loud cracking sounds could be heard. Upon inspection the following day, large cracks were found in the coating. The coating could be easily removed from the electrode but the surface underneath the coating appeared to be well protected. This indicated that the cracks occurred during cooldown. The initial weight of the coated electrode was 3541 grams. After the oxidation test, the coated electrode weighed 3500 grams. This represented a 41 gram loss or 1.16 percent. It will be seen from this example that a dual layer coating without aluminum in the base layer is not an effective coating.

EXAMPLE 3

A slurry was prepared as in Example 1 but in this instance aluminum powder was added to the slurry in an amount of approximately 10% by weight based on the total weight of the refractory cement. The final composition of the slurry was: 51.7% by weight mullite, 10.3% by weight silica, 28.5% by weight waterglass, and 9.1% by weight aluminum. The waterglass could be expressed as 9.5% by weight $Na_2O.3.8\ SiO_2$ and 19.0% by weight water, based upon the total weight of the slurry. On a water-free basis, the dry ingredients had the following composition: 64.1% by weight mullite, 12.8% by weight silica, 11.3% by weight aluminum and 11.8% by weight sodium silicate solids as $Na_2O.3.8\ SiO_2$.

A 5 inch diameter graphite electrode of the same grade used in Example 1 was coated with the slurry in two separate layers and dried. An outer layer was then applied using the same second slurry containing about 20% by weight of silicon carbide particles. The coated electrode was placed in the Globar furnace and was held at 500° C. for 1 hour after which the furnace temperature was increased to 1350° C. After 2½ hours at this temperature, the coated electrode was removed from the furnace and quenched to room temperature. The electrode remained luminescent for about 10 minutes. Upon inspection the next day, the coating on half of the electrode was found to be severely cracked and some sections of the coating had fallen away from the graphite surface. However, the exposed portion of the graphite was not oxidized indicating that the cracks occurred during cooldown or thermal shock. The opposite side of the electrode was slightly glazed and appeared to bond well to the graphite. No cracks were observed. The coated electrode weighed 3658 grams before the test. After the test, the electrode weighed 3628 grams for a 30 gram or 0.28% loss. It will be seen from this example that a dual layer coating with only 10 percent aluminum in the base layer is still not effective since the coating does undergo some spallation.

EXAMPLE 4

Another slurry was prepared as in Example 3 except that the amount of aluminum added was increased to approximately 15% by weight based on the weight of the refractory cement. The final composition of the slurry was: 49.5% by weight mullite, 9.8% by weight silica, 27.3% by weight waterglass, and 13.0% by weight aluminum. The waterglass could be expressed as 9.1% by weight $Na_2O.3.8\ SiO_2$ and 18.2% by weight water, based upon the total weight of the slurry. On a water-free basis, the dry ingredients had the following composition: 60.8% by weight mullite, 12.0% by weight silica, 16.0% by weight aluminum, 11.1% by weight sodium silicate solids as $Na_2O.3.8\ SiO_2$.

A 5 inch diameter graphite electrode of the same grade used in Example 1 was coated with two applications using this slurry to form the base layer. The outer layer of the dual layer coating was applied using the same silicon carbide-containing slurry prepared as in Example 1. The coated electrode was placed into the Globar furnace and subjected to the same oxidation test at 1350° C. After 2½ hours, the coated electrode was removed from the furnace and allowed to cool at ambient temperature. The coating bonded exceptionally well to the graphite and there was no evidence of pinholes, puffing, or cracks. The graphite electrode and the coating weighed 3575 grams before the oxidation test and 3548 grams afterwards for a 27 gram or 0.76% loss. This example shows that a dual layer coating with 15 percent aluminum in the base layer is effective since no spallation occurred.

EXAMPLE 5

Another slurry was prepared as in Example 1 except that the amount of aluminum added was increased to approximately 40% by weight of the refractory cement. The final composition of the slurry was: 40.6% by weight mullite, 8.1% by weight silica, 22.4% by weight waterglass, and 28.6% by weight aluminum. The waterglass could be expressed as 7.5% by weight $Na_2O.3.8\ SiO_2$ and 14.9% by weight water, based upon the total weight of the slurry. On a water-free basis, the dry ingredients had the following composition: 47.9% by weight mullite, 9.6% by weight silica, 33.7% by weight aluminum, 8.9% by weight sodium silicate solids as $Na_2O.3.8\ SiO_2$.

Again, a 5 inch diameter graphite electrode of the same grade was coated with two applications using this slurry to form the base layer. An outer layer was then applied using the same silicon carbide-containing slurry prepared as in Example 1. The coated electrode was placed into the Globar furnace and subjected to the same oxidation test at 1350° C. After 2½ hours, the coated electrode was removed from the furnace and allowed to cool at ambient temperature. The coating bonded well to the graphite and there was no puffing or cracks. The electrode weighed 3677 grams before the oxidation test and 3652 grams afterwards for a 25 gram or 0.68 percent loss. This example shows an effective dual layer coating with 40 percent aluminum in the base layer.

EXAMPLE 6

Another slurry was prepared as in Example 1 except that the amount of aluminum added was increased to approximately 50% by weight based on the weight of the refractory cement. The final composition of the slurry was: 38.0% by weight mullite, 7.5% by weight silica, 20.9% by weight waterglass, and 33.3% by weight aluminum. The waterglass could be expressed as 7.0% by weight $Na_2O.3.8\ SiO_2$ and 13.9% by weight water, based upon the total weight of the slurry. On a water-free basis, the dry ingredients had the following composition: 44.2% by weight mullite, 8.7% by weight silica, 38.8% by weight aluminum, and 8.1% by weight sodium silicate solids as $Na_2O.3.8\ SiO_2$.

A 5 inch diameter graphite electrode of the same grade was coated with two applications using this slurry to form the base layer. The same silicon carbide-containing slurry prepared as in Example 1 was used to apply the outer layer of the coating. The coated electrode was placed into the Globar furnace and subjected to the same oxidation test at 1350° C. After 2½ hours, the coated electrode was removed from the furnace and allowed to cool at ambient temperature. Upon inspection, it was observed that large bubble-like islands of silicon carbide had formed and glazed with a network of cracks running between them. The coating, nevertheless, appeared to have bonded well to the graphite. The electrode weighed 3576 grams before the oxidation test and 3550 grams afterwards for a 26 gram or 0.73 percent loss. It will be seen from this example that an effective dual layer coating can be formed with 50 percent aluminum in the base layer since a good bond is achieved with the graphite.

EXAMPLE 7

Another slurry was prepared as in Example 3 except that the amount of aluminum added was increased to approximately 100 percent by weight based on the weight of the refractory cement. The final composition of the slurry was: 28.4% by weight mullite, 5.6% by weight silica, 15.6% by weight waterglass, and 50.0% by weight aluminum. The waterglass could be expressed as 5.2% by weight $Na_2O.3.8\ SiO_2$ and 10.4% by weight water, based upon the total weight of the slurry. On a water-free basis, the dry ingredients had the following composition: 31.8% by weight mullite, 6.3% by weight silica, 56.0% by weight aluminum, and 5.9% by weight sodium silicate solids as $Na_2O.3.8\ SiO_2$.

Again, a 5 inch diameter graphite electrode of the same grade as in Example 1 was coated with two applications using this slurry to form the base layer. The outer layer of the coating was applied using the same silicon carbide-containing slurry prepared in Example 1. The coated electrode was placed into the Globar furnace and subjected to the same oxidation test at 1350° C. After 2½ hours, the coated electrode was removed from the furnace and allowed to cool at ambient temperature. Upon inspection, a network of microcracks was observed to have formed in spaces between the silicon carbide islands in the aluminum-containing base layer. However, the base layer appeared to bond well to the graphite. The coated electrode weighed 3586 grams before the oxidation test and 3550 grams afterwards for a 33 gram or 0.92 percent loss. It will be seen from this example that as the amount of aluminum in the base layer can be increased to 100 percent, but the effectiveness of the outer glassy layer decreases due to its non-uniformity.

EXAMPLE 8

A 5 inch diameter graphite electrode measuring about 6 inches long was coated with two applications using a first slurry prepared as in Example 1 with about 30 percent by weight of aluminum to form the base layer of a dual layer coating. The outer layer of the coating was prepared using a second slurry also prepared as in Example 1 but in which no silicon carbide was added. The graphite electrode was also of the same grade as in Example 1. After the coating had dried, the coated electrode was placed inside the Globar furnace and heated to about 500° C. The furnace was held at this temperature for about one hour. The furnace temperature was then increased in three hours to about 1350° C. Air was purged through the furnace at about 7.5 SCFH during the oxidation test. After 2½ hours, the coated electrode was removed from the furnace and quenched by allowing the electrode to stand at ambient temperature. The electrode remained luminescent for about 10 minutes and cracking noises were heard during cooldown. It was later observed upon inspection that a network of cracks had formed around the surface of the coating. The coating appeared to have bonded to the graphite at certain areas but in other areas there was no evidence of any bond at all. This lack of bonding in some areas is believed to result from excessive expansion of the outer layer during curing. The coated electrode weighed 3535 grams before the oxidation test and 3500 grams afterwards for a 35 gram or 0.99 percent loss.

EXAMPLE 9

A 5 inch diameter graphite electrode also of the same grade measuring about 6 inches long was coated with two applications using a first slurry prepared as in Example 1 with about 30% by weight of aluminum to form the base layer of a dual layer coating. The outer layer of the coating was applied using a second slurry also prepared as in Example 1 with about 5 percent by weight of silicon carbide. The final composition of the second slurry was: 54.2% by weight mullite, 10.8% by weight silica, 29.9% by weight waterglass, and 4.8% by weight silicon carbide. The waterglass could be expressed as 10.0% by weight $Na_2O.3.8\ SiO_2$ and 19.9% by weight water, based upon the total weight of the slurry. On a water-free basis, the dry ingredients had the following composition: 67.9% by weight mullite, 13.5% by weight silica, 6.0% by weight silicon carbide, and 12.5% by weight sodium silicate solids as $Na_2O.3.8\ SiO_2$. After the coating had dried, the coated electrode was placed inside a Globar furnace heated to about 500° C. The furnace was held at this temperature for about one hour. The furnace temperature was then increased in three hours to 1350° C. Air was purged through the furnace at about 7.5 SCFH during the oxidation test. After 2½ hours, the coated electrode was removed from the furnace and quenched to room temperature. Upon inspection, the coating appeared to bond well to the graphite and some microcracks were observed when viewed under a microscope. The coating appeared slightly glazed. The coated sample weighed 3506 grams before the oxidation test and 3476 grams afterwards for a 30 gram or 0.86% loss. It will be seen from this example that when the amount of silicon carbide in the glassy outer layer is increased to about 5 percent, an effective dual layer coating is achieved.

EXAMPLE 10

A 5 inch diameter graphite electrode also of the same grade measuring about 6 inches long was coated with two applications using a first slurry prepared as in Example 1 with about 30% by weight of aluminum to form the base layer of a dual layer coating. The outer layer of the coating was applied using a second slurry prepared as in Example 1 but in which 40% by weight of silicon carbide was added. The final composition of the second slurry was: 40.6% by weight mullite, 8.1% by weight silica, 22.4% by weight waterglass, and 28.6% by weight silicon carbide. The waterglass could be expressed as 7.5% by weight $Na_2O.3.8\ SiO_2$ and 14.9% by weight water, based upon the total weight of the slurry. On a water-free basis, the dry ingredients had the following composition: 47.9% by weight mullite, 9.6% by weight silica, 33.7% by weight silicon carbide, and 8.9% by weight sodium silicate solids as $Na_2O.3.8SiO_2$. After the coating had dried, the coated electrode was placed inside a Globar furnace and subjected to the same oxidation test at 1350° C. After 2½ hours, the coated electrode was removed from the furnace and allowed to cool to room temperature. The coating was found to be glazed and had bonded well to the graphite. Minor microcracking was observed when viewed through a microscope. The coated electrode sample weighed 3588 grams before the oxidation test and 3559 grams afterwards for a 29 gram loss or 0.80% loss. This example shows that an effective dual layer coating can be achieved with 40 percent silicon carbide in the outer glassy layer.

EXAMPLE 11

A 5 inch diameter graphite electrode of the same grade measuring about 6 inches long was coated with two applications using a first slurry prepared as in Example 1 with about 30% by weight of aluminum to form the base layer of a dual layer coating. The outer layer of the coating was applied using a second slurry prepared from the same cement as in Example 1 but in which 60% by weight of silicon carbide was added. The final composition of the slurry was: 35.6% by weight mullite, 7.1% by weight silica, 19.7% by weight waterglass, and 37.5% by weight silicon carbide. The waterglass could be expressed as 6.6% by weight $Na_2O.3.8\ SiO_2$ and 13.1% by weight water, based upon the total weight of the slurry. On a water-free basis, the dry ingredients had the following composition: 41.0% by weight mullite, 8.2% by weight silica, 43.2% by weight silicon carbide, and 7.6% by weight sodium silicate solids as $Na_2O.3.8\ SiO_2$. After the coating had dried, the coated electrode was placed into a Globar furnace and subjected to the same oxidation test at 1350° C. After 2½ hours, the coated electrode was removed from the furnace and cooled to room temperature. The coating bonded well to the graphite and there was no evidence of puffing or cracks in the coating. The coated sample weighed 3516 grams before the oxidation test and 3489 grams afterwards for a 27 gram or 0.77% loss. This example shows that an effective dual layer coating can be achieved with 60 percent silicon carbide in the outer glassy layer.

EXAMPLE 12

A 5 inch graphite electrode of the same grade measuring about 6 inches long was coated with two applications using a first slurry prepared as in Example 1 again with about 30% by weight of aluminum to form the base layer of a dual layer coating. The outer layer of the coating was applied using a second slurry containing 30 parts by weight sodium silicate and 70 parts by weight silicon carbide particles. The refractory cement used in the previous examples was not employed in the preparation of this slurry. After the coating had dried, the coated electrode was placed into a Globar furnace and heated to about 500° C. The furnace was held at this temperature for about 1 hour. The furnace temperature was increased in 3 hours to about 1350° C. After 2½ hours, the coated electrode was removed from the furnace and quenched to room temperature. The electrode remained luminescent for some time and when cooled, no cracks or puffing were evident. The outer coating was slightly flaky but remained bonded to the graphite. The coated electrode weighed 3518 grams before the oxidation test and 3502 grams afterwards for a 16 gram loss or 0.45%. It will be seen from this example that an effective dual layer coating can be prepared when the outer glassy layer is composed predominantly of silicon carbide.

EXAMPLE 13

A 5 inch diameter graphite electrode of the same grade measuring about 6 inches long was coated with a single application using a slurry prepared as in Example 1 containing 30% by weight of aluminum to form the base layer of a dual layer coating. After the first layer had dried, an outer layer was then applied using the same slurry prepared in Example 1 containing about 20% by weight of SiC particles. The coated electrode was dried and then placed into a Globar furnace and subjected to the same oxidation test at 1350° C. The coated electrode was then removed from the furnace and quenched to room temperature. The sample remained luminescent for more than 10 minutes with no puffing or pinholes. Upon inspection, the coating appeared glazed with no cracks and bonded well to the graphite. However, many pores were evident on the surface of the coating. The coated electrode weighed 3615 grams before the oxidation test and 3596 grams afterwards for a 19 gram or 0.53% loss. It will be seen from this example that an effective dual layer coating can be prepared when only a single application of the first slurry is employed.

EXAMPLE 14

A 5 inch diameter graphite electrode of the same grade measuring about 6 inches long was coated with two applications using a slurry prepared as in Example 1 but containing up to 40% by weight of aluminum based on the total weight of the cement. The aluminum was Metco No. 54 high purity, spherical powder. The additional outer layer containing SiC was omitted. FIG. 4 is a photograph of this coating. The coated electrode was placed into a Globar furnace at 500° C. and held there for 1 hour. The furnace temperature was then increased to 1350° C. in 3 hours and held at this temperature for 2½ hours. The coated electrode was removed from the furnace and quenched to room temperature. During cooling, cracking sounds were heard after five minutes while still hot (approximately 900° C.). Upon inspection, the coating appeared to bond well to the graphite and many micrcocracks were found but no bloating occurred. Only minor oxidation was evident at the bottom of the coated electrode. It will be seen from this example that single layer coating containing aluminum according to the invention can be employed to effectively protect a graphite surface.

EXAMPLE 15

A 5 inch diameter graphite electrode measuring about 6 inches long was coated with two applications using a first slurry prepared as in Example 1 with about 30 percent by weight of aluminum. After the coating had dried, the coated electrode was placed inside the Globar furnace and heated to about 500° C. The furnace was held at this temperature for about one hour. The furnace temperature was the increased in three hours to about 1350° C. Air was purged through the furnace at about 7.5 SCFH during the oxidation test. After 2½ hours, the coated electrode was removed from the furnace and quenched by allowing the electrode to stand at ambient temperature. It was later observed upon inspection that a network of cracks had formed around the surface of the coating. The coating appeared to be well bonded to the graphite. The coated electrode weighed 3666 grams before the oxidation test and 3649 grams afterwards for a 17 gram or 0.46 percent loss.

EXAMPLE 16

Using the same procedures set forth in Example 1, a 20-inch diameter graphite electrode measuring about 10 inches long was coated with two applications of a slurry as in Example 1 containing 30% by weight aluminum to form the base layer of a dual layer coating. The outer layer of the coating was applied using a second slurry also prepared in Example 1 containing about 20% by weight SiC. The graphite electrode sample was taken from a 20-inch×96-inch electrode. The coated electrode was placed into an induction furnace and two graphite spacers were set on top of the electrode. The furnace was held at 500° C., under non-oxidizing conditions, for about 1 hour and then raised to a temperature of 1350° C. in about 3 hours. The furnace was held at this temperature for 1½ hours and was then quenched to room temperature. Upon inspection, the coating was found to bond well to the graphite with some cracks on the sides of the coating. However, these cracks resulted from the scissor action gripping device used to remove the coated electrode from the furnace. This example shows that a dual layer coating according to the invention can be successfully employed on large diameter furnace electrodes.

EXAMPLE 17

A slurry was prepared as in Example 1 but in this case both aluminum and silicon carbide were added together, each in an amount of approximately 20% by weight based on the total weight of the refractory cement. The final composition of the slurry was: 40.6% by weight mullite, 8.1% by weight silica, 22.4% by weight waterglass, 14.3% by weight aluminum, and 14.3% by weight SiC. The waterglass could be expressed as 7.5% by weight $Na_2O.3.8\ SiO_2$ and 14.9% by weight water, based upon the total weight of the slurry. On a water-free basis, the dry ingredients have the following composition: 47.9% by weight mullite, 9.6% by weight silica, 16.8% by weight aluminum, 16.8% by weight SiC and 8.9% by weight sodium silicate solids as $Na_2O.3.8\ SiO_2$.

A 5 inch diameter electrode of the same grade as in Example 1 measuring about 6 inches long was coated with two applications of the slurry and dried. The coated electrode was then placed inside the Globar furnace and heated to 500° C. and kept at this temperature for 1 hour. The furnace temperature was then increased in 3 hours to 1350° C. and held at this temperature for an additional 2½ hours. The electrode was periodically checked and showed no signs of pinholes or puffing. The electrode was quenched to room temperature and inspected. Only slight puffing was detected but many pinholes were scattered throughout the coating. The coating lost its luminescence quickly, apparently due to the lack of any bond. When cool, the coating was easily removed and showed evidence of oxidation on the surface of the graphite. The coated electrode weighed 3658 grams before the oxidation test and 3520 grams afterwards for a 38 gram loss or 3.77%. It will be evident from this example that a coating prepared using a slurry containing both aluminum and silicon carbide is not effective.

EXAMPLE 18

A slurry was prepared using the same refractory cement as in Example 1 except that the aluminum was replaced with 20% by weight silicon metal powder. The final composition of the slurry was: 47.4% by weight mullite, 9.4% by weight silica, 26.1% waterglass and 16.7% by weight silicon. The waterglass could be expressed as 8.7% by weight $Na_2O.3.8\ SiO_2$ and 17.4% by weight water, based upon the total weight of the slurry. On water-free basis, the dry ingredients had the following composition: 57.7% by weight mullite, 11.4% by weight silica, 20.3% by weight silicon, 10.6% by weight sodium silicate solids as $Na_2O.3.8SiO_2$. The silicon metal used in this sample was 10%–100 mesh and 10%–200 mesh.

A 5 inch diameter electrode of the same grade measuring about 6 inches long was coated with two applications using this slurry to form the base layer of a dual layer coating. The outer layer of the coating was applied using a second slurry containing 20% by weight SiC as described in Example 1. The coated electrode was placed into a Globar furnace and heated to a temperature of 500° C. for 1 hour. The furnace temperature was then increased to about 1350° C. in 3 hours and held at this temperature for 2½ additional hours. The electrode was removed from the furnace and quenched to room temperature. The surface of the coating was covered with cracks and pinholes and there was no evidence of any bond between the coating and the graphite. The coated electrode weighed 3575 grams before the oxidation test. After the test, the electrode weight 3462 grams or a 113 gram loss or 3.16%. It will be seen from this example that a dual layer coating containing silicon instead of aluminum in the base layer does not provide effective protection for the graphite electrodes.

EXAMPLE 19

A 5 inch diameter graphite electrode of the same grade measuring about 6 inches long was coated with two applications using a slurry prepared as in Example 1 containing about 30% by weight aluminum to form the base layer of a dual layer coating. The outer layer was then applied using a second slurry containing about 20% by weight of boron carbide particles, based upon the weight of the cement. The second slurry had the following composition: 47.4% by weight mullite, 9.4% by weight silica, 26.1% by weight waterglass and 16.7% by weight boron carbide. The water glass could be expressed as 8.7% by weight $Na_2O.3.8SiO_2$ and 17.4% by weight water, based upon the total weight of the slurry. On a water-free basis, the dry ingredients have the following composition: 57.7% by weight mullite, 11.4% by weight silica, 20.3% by weight boron carbide and 10.6% by weight sodium silicate solids as $Na_2O.3.8SiO_2$. The coated electrode was placed inside a Globar furnace heated to about 500° C. and held at this temperature for about 1 hour. The furnace, temperature was then increased in 3 hours to about 1350° C. After 2½ hours, the coated electrode was removed from the furnace and quenched to room temperature. A number of microcracks could be seen in the coating when examined under a microscope and one pinhole was also observed. The coating was rather hard and appeared to bond well to the graphite. The coated electrode weighed 3596 grams before the oxidation test and 3570 grams afterwards for a 36 gram loss or 1.00%. It will be seen from this example that an effective dual layer coating can be prepared using boron carbide instead of silicon carbide in the outer glassy layer.

EXAMPLE 20

A 5 inch diameter graphite electrode of the same grade measuring about 6 inches long was coated with three applications using a slurry prepared as in Example 1 containing about 30% by weight aluminum to form the base layer of a multiple layer coating. An intermediate layer was applied using a second slurry also prepared as in Example 1 containing about 20% by weight SiC. An outer layer was then applied using a third slurry containing about 76.1% by weight of a borosilicate frit and a waterglass binder. The borosilicate frit was Frit No. 3227 produced by Ferro Corp and had the following composition by weight: 4.1% $K_2O$, 13.9% $Na_2O$, 15.6% $Al_2O$, 28.5% $B_2O$ and 37.9% $SiO_2$. The third slurry had the following composition: 76.1% by weight borosilicate frit and 23.9% by weight waterglass. The waterglass could be expressed as 9.1% by weight $Na_2O.3.2SiO_2$ and 14.7% by weight water, based upon the total weight of the slurry. On a water-free basis, the dry ingredients had the following composition: 89.2% by weight borosilicate frit and 10.8% by weight sodium silicate. The coated electrodes was placed inside a Globar furnace, heated to about 500° C. with an air purge and held at this temperature for about one hour. The furnace temperature was then increased in 4 hours to about 1350° C. After 2½ hours, the coated electrode was removed from the furnace and quenched to room temperature. The appearance of the coating was good although the outer layer seemed to be somewhat uneven. Tiny microcracks were seen under a microscope and two pinholes appeared near the top edge of the coating. The bond between the coating substrate was good and there was no evidence of any spallation. The coated electrode weighed 3539 grams before the oxidation-test and 3570 grams afterward for a 43 gram loss or 1.22%. This example demonstrates that an effective multilayer coating can be made using an outer layer prepared from a borosilicate frit. This particular frit had a fusion temperature of about 750° C.

EXAMPLE 21

A 5 inch diameter graphite electrode of the same grade measuring about 6 inches long was coated with a base and intermediate layers in the same manner as described in the previous Example 20 and using the same first and second slurry for preparing each of the respective layers. An outer layer was then applied using a third slurry containing a borosilicate frit, waterglass and a filler. The same borosilicate frit was used in this example, i.e. frit No. 3227. The filler used in the third slurry was $Al_2O_3$. The third slurry had the following composition: 59.5% by weight borosilicate frit, 23.9% by weight waterglass and 16.6% by weight filler. The waterglass could be expressed as 9.1% by weight $Na_2O.3.2SiO_2$ and 14.7% by weight water, based upon the total weight of the slurry. On a water-free basis the dry ingredients had the following composition: 69.8% by weight borosilicate frit, 19.5% by weight $Al_2O_3$ and 10.8% by weight sodium silicate solids as $Na_2O.3.2SiO_2$. The coating electrode was placed inside a Globar furnace, heated to about 500° C. with an air purge and held at this temperature for about 1 hour. After four hours, the furnace temperature was increased to about 1350° C. The coated electrode was held at this temperature for about 2½ hours and then removed from the furnace and quenched to room temperature. The appearance of the coating was good and it bonded well to the carbon electrode. A number of microcracks could be observed under a microscope. The outer glaze had bubbles and a portion of the glassy layer had melted down from the top edge exposing some of the base layer. However no oxidation of the substrate was observed. The coated electrode weighted 3415 grams before the oxidation test and 3378 grams afterwards for a 37 gram loss or 1.08%. This example demonstrates that an effective multilayer coating could be made using an outer layer prepared from a borosilicate frit filler and waterglass.

EXAMPLE 22

Four 1¼ inch diameter graphite electrode samples of the same grade measuring about 2 inches long were coated with three applications using a slurry prepared as in Example 1 containing about 30% by weight aluminum to form the base layer of a dual layer coating. The outer layer was then applied using a second slurry containing a borosilicate frit and waterglass. The borosilicate frit was the same Ferro frit No. 3227. The second slurry had the following composition: 76.1% by weight borosilicate frit and 23.9% by weight waterglass. The waterglass could be expressed as 9.1% by weight $Na_2O.3.2SiO_2$ and 14.7% by weight water, based upon the total weight of the slurry. On a water-free basis, the dry ingredients had the following composition: 89.2% by weight borosilicate frit and 10.8% by weight sodium silicate solids as $Na_2O.3.2SiO_2$. The coated electrode samples were placed inside a CM furnace heated to various temperatures for a period of about three hours with no purge. The coated electrode samples where then removed from the furnace and examined. The samples were then identified as follows:

(1) 700° C./3 hrs.—the sample coatings were well bonded and glazed with some microcracks formed in the coating. Many small bubbles were observed in glaze at places where a reaction did not take place.

(2) 800° C./3 hrs.—the coating sample was also well bonded and glazed with microcracks formed in the coating. Minor bubbling occurred in small areas were no reaction took place.

(3) 900° C./3 hrs.—the coating sample was well bonded and glazed with some microcracks but no bubbling observed.

(4) 1000° C./3 hrs.—the coating sample was well bonded and glazed with some microcracks but no bubbling was observed.

It will be seen from this example that an effective dual layer coating can be made using a glassy outer layer prepared from a boro-silicate frit and also that bubbling can be eliminated by curing the glassy layer at sufficiently elevated temperatures (e.g. 900° C.) to assure complete reaction.

EXAMPLE 23

Four 1¼ inch diameter graphite electrode samples of the same grade measuring about 2 inches long were coated with three applications using a slurry prepared as in Example 11 containing about 30% by weight aluminum to form the base layer of a dual layer coating. An outer layer was then applied using a second slurry containing a borosilicate frit, waterglass and a filler. A Ferro frit No. 3227 was again used in this example and the filler was silicon carbide. The second slurry had the following composition: 59.5% by weight borosilicate frit, 16.7% by weight silicon carbide and 23.8% by weight waterglass. The waterglass could be expressed as 9.1% by weight $Na_2O.3.2SiO_2$ and 14.7% by weight water, based upon the total weight of the slurry. On a water-free basis the dry ingredients had the following composition: 69.8% by weight borosilicate frit, 19.6% by weight silicon carbide and 10.7% by weight sodium silicate solids as $Na_2O.3.2SiO_2$. The coated electrode samples were then placed inside a CM furnace and were heated to various temperatures for about 3 hours with no purge. The samples were then removed from the furnance and examined. The samples were identified as follows:

(1) 700° C./3 hrs.—the coated samples were bonded to the substrate with some microcracks. The glaze coating was slightly frothy and contained some bubbles.

(2) 800° C./3 hrs.—the coated samples were bonded to the substrate except in one area near the top and contained some microcracks. The outer layer was nicely glazed with some bubbling.

(3) 900° C./3 hrs.—the coated samples were well bonded to the substrate with some microcracks. The outer glaze was smooth and clear with no bubbles.

(4) 1000° C./3 hrs.—the coated sample were well bonded to the substrate with some microcracks. The outer glaze was smooth and clear with no bubbles.

Although the present invention has been described herein with particular regard to a number of specific embodiments, it will be apparent to those skilled in the art that other variations and modifications may be made within the spirit and scope of the invention.

I claim:

1. An article comprising a carbonaceous substrate and an oxidation prohibitive coating overlying and bonded to said substrate, said coating comprising a compliant, low strength, porous, particulate, sintered, ceramic, refractory material containing mullite as a major ingredient.

2. An article according to claim 1 wherein said coating comprises mullite, aluminum oxide and silicon particles.

3. An article according to claim 2 wherein said particles are loosely bonded to one another with many void spaces between said particles.

4. An article according to claim 2 wherein said coating also comprises refractory fibers.

5. An article according to claim 4 wherein said refractory fibers comprise aluminum, silicon, nitrogen and oxygen.

6. An article according to claim 5 wherein said refractory fibers comprise a nitrous aluminosilicate compound.

7. An article according to claim 5 wherein said refractory fibers are arranged in clusters within said void spaces between said particles.

8. An article according to claim 4 wherein said coating also comprises hollow aluminum oxide shells containing said refractory fibers.

9. An article according to claim 1 wherein the bond between said coating and said substrate comprises refractory fibers formed in situ within the pores of said substrate.

10. An article according to claim 9 wherein said refractory fibers comprise aluminum, silicon, nitrogen and oxygen.

11. An article according to claim 10 wherein said refractory fibers comprise a nitrous aluminosilicate compound.

12. An article comprising a carbonaceous substrate and an oxidation prohibitive coating thereon, said coating comprising a base layer overlying and bonded to said substrate, said base layer being composed of a compliant, low strength, porous, sintered, particulate, ceramic, refractory material containing mullite as a major ingredient, said material having a tensile strength which is substantially less than the shear strength of the interfacial bond between said base layer and said substrate, and a cover layer overlying and bonded to said base layer comprising a rigid, glassy substance which is plastic and flowable at temperatures above about 750° C.

13. An article according to claim 12 wherein said base layer comprises mullite, aluminum oxide and silicon particles.

14. An article according to claim 13 wherein said particles are loosely bonded to one another with many void spaces between said particles.

15. An article according to claim 14 wherein said base layer also comprises refractory fibers.

16. An article according to claim 15 wherein said refractory fibers comprise aluminum, silicon, nitrogen and oxygen.

17. An article according to claim 16 wherein said refractory fibers comprise a nitrous aluminosilicate compound.

18. An article according to claim 14 wherein said refractory fibers are arranged in clusters within said void spaces between said particles.

19. An article according to claim 15 wherein said base layer also comprises hollow aluminum oxide shells containing said refractory fibers.

20. An article according to claim 12 wherein said cover layer comprises oxides of aluminum, sodium and silicon and metallic carbides of silicon or boron.

21. An article according to claim 20 wherein said cover layer comprises particles of mullite and silicon carbide.

22. An article according to claim 12 wherein said cover layer comprises oxides of boron, sodium and silicon.

23. An article according to claim 15 wherein the bond between said base layer and said substrate comprises refractory fibers formed in situ within the pores of said substrate.

24. An article according to claim 22 wherein said refractory fibers comprise aluminum, silicon, nitrogen and oxygen.

25. An article according to claim 23 wherein said refractory fibers comprise a nitrous aluminosilicate compound.

26. An article according to claim 13 wherein said base layer has a modulus of elasticity of about $5.9 \times 10^6$ pounds per square inch, a flexural strength of about 2500 pounds per square inch and a coefficient of thermal expansion (CTE) of about $5.5 \times 10^{-6}$ inch/inch/°C.

27. An article according to claim 13 wherein said cover layer has a modulus of elasticity of about $8 \times 10^6$ pounds per square inch.

28. An article according to claim 13 wherein said carbonaceous substrate comprises electrode grade graphite having a coefficient of thermal expansion (CTE) of less than about $1.5 \times 10^{-6}$ inch/inch/°C.

29. An electric arc furnace electrode having a coating according to any one of claims 12 to 27.

30. An article comprising a carbonaceous substrate having an oxidation prohibitive coating thereon which can be rendered resistant to thermal shock upon heating to elevated temperatures above about 1000° C., said coating comprising at least one layer of a dry, particulate composition comprising from about 30 to about 75 percent by weight mullite, 0 to about 12 percent by weight silica, from about 15 to about 60 percent by weight aluminum and from about 5 to about 11 percent by weight of a silicon-containing binder material.

31. An article according to claim 30 wherein said silicon-containing binder material is selected from the group consisting of sodium silicate, potassium silicate, ethyl silicate and colloidal silica.

32. An article according to claim 31 wherein said dry, particulate composition comprises about 52.3 percent by weight mullite, about 10.4 percent by weight silica, about 26.7 percent by weight aluminum and about 9.6 percent by weight sodium silicate.

33. An article according to claim 30 wherein said coating comprises an additional layer overlying said first layer, said additional layer being composed of a dry, particulate composition comprising 0 to about 70 percent by weight mullite, 0 to about 14 percent by weight silica, from about 5 to about 95 percent by weight of a metallic carbide selected from the group consisting of silicon carbide and boron carbide, and from about 5 to about 14 percent by weight of a silicon-containing binder material.

34. An article according to claim 33 wherein said silicon-containing binder material is selected from the group consisting of sodium silicate, potassium silicate, ethyl silicate and colloidal silica.

35. An article according to claim 34 wherein said dry, particulate composition comprises about 57.7 percent by weight mullite, about 11.0 percent by weight silica, about 20.3 percent by weight silicon carbide and about 10.6 percent by weight sodium silicate.

36. An article according to claim 34 wherein said dry, particulate composition comprises about 57.7 percent by weight mullite, about 11 percent by weight silica, about 20.3 percent by weight boron carbide and about 10.6 percent by weight sodium silicate.

37. An article according to claim 33 wherein said coating comprises an outer layer overlying said additional layer, said outer layer being composed of a dry, particulate composition comprising from about 25 to about 85 percent by weight borosilicate frit, from about 5 to about 15 percent by weight silicon-containing binder material and 0 to about 65 percent by weight filler material.

38. An article according to claim 37 wherein said borosilicate frit comprises from about 7 to about 52 percent by weight $Na_2O$, from about 8 to about 64 percent by weight $B_2O_3$ and from about 6 to about 68 percent by weight $SiO_2$.

39. An article according to claim 37 wherein said silicon-containing binder material is selected from the group consisting of sodium silicate, potassium, silicate, ethyl silicate and collodial silica.

40. An article according to claim 37 wherein said filler material is selected from the group consisting of $Al_2O_3$, SiC, mullite, $SiO_2$ and $B_4C$.

41. An article according to claim 33 wherein said coating comprises an additional layer overlying said first layer, said additional layer being composed of a dry, particulate composition comprising from about 25 to about 85 percent by weight borosilicate frit, from about 5 to about 15 percent by weight silicon-containing binder material and 0 to about 65 percent by weight filler material.

42. An article according to claim 41 wherein said borosilicate frit comprises from about 7 to about 52 percent by weight $Na_2O$, from about 8 to about 64 percent by weight $B_2O_3$ and from about 6 to about 68 percent by weight $SiO_2$.

43. An article according to claim 41 wherein said silicon-containing binder material is selected from the group consisting of sodium silicate, potassium silicate, ethyl silicate and collodial silica.

44. An article according to claim 41 wherein said filler material is selected from the group consisting of $Al_2O_3$, SiC, mullite, $SiO_2$ and $B_4C$.

45. An article according to claim 30 or 33 wherein said carbonaceous substrate is composed of electrode grade graphite having a coefficient of thermal expansion (CTE) less than about $1.5 \times 10^{-6}$ inch/inch/°C.

46. An electric arc furnace electrode having a coating according to any one of claims 30 to 44.

47. A coating composition for applying an oxidation prohibitive coating onto a carbonaceous substrate, which comprises from about 30 to about 75 percent by weight mullite, 0 to about 12 percent by weight silica, from about 15 to about 60 percent by weight aluminum and from about 5 to about 11 percent by weight of a silicon-containing binder material, all percentages being based upon the total weight of the dry ingredients.

48. A coating composition according to claim 47 wherein said silicon-containing binder material is selected from the group consisting of sodium silicate, potassium silicate, ethyl silicate and colloidal silica.

49. A coating composition according to claim 48 comprising about 52.3 percent by weight mullite, about 10.4 percent by weight silica, about 26.7 percent by weight aluminum and about 9.6 percent by weight sodium silicate.

50. A method of protecting a carbonaceous article against oxidation and erosion at elevated temperatures, which comprises:
(a) applying to the surfaces of said carbonaceous article a particulate mixture comprising from about 30 to about 75 percent by weight mullite, 0 to about 12 percent by weight silica, from about 15 to about 60 percent by weight aluminum, and from about 5 to about 11 percent by weight of a silicon-containing binder material, all percentages being based upon the total weight of the dry ingredients; and
(b) heating said particulate mixture to temperatures at which silica is reduced by aluminum to produce aluminum oxide and silicon.

51. A method according to claim 41 wherein said silicon-containing binder material is selected from the group consisting of sodium silicate, potassium silicate, ethyl silicate and colloidal silica.

52. A method according to claim 50 wherein said particulate mixture comprises about 52.3 percent by weight mullite, about 10.4 percent by weight silica, about 26.7 percent by weight aluminum and about 9.6 percent by weight sodium silicate.

53. A method according to claim 50 wherein said particulate mixture is applied to the surfaces of said carbonaceous article in the form of an aqueous slurry.

54. A method according to claim 53 wherein said slurry is dried under conditions to produce a hard coherent layer adhering to said carbonaceous article.

55. A method according to claim 54 wherein said slurry is dried in air at ambient temperatures.

56. A method according to claim 54 wherein said dried coherent layer is heated to a temperature of at least about 1000° C.

57. A method of protecting a carbonaceous article against oxidation and erosion at elevated temperatures, which comprises:
(a) applying to the surfaces of said carbonaceous article a first particulate mixture comprising from about 30 to about 75 percent by weight mullite, 0 to about 12 percent by weight silica, from about 15 to about 60 percent by weight aluminum and from about 5 to about 11 percent by weight of a silicon-containing binder material, all percentages being based upon the total weight of the dry ingredients;
(b) applying to said first particulate mixture a second particulate mixture comprising 0 to about 70 percent by weight mullite, 0 to about 14 percent by weight silica, from about 5 to about 95 percent by weight of a metallic carbide selected from the group consisting of silicon carbide and boron carbide, and from about 5 to about 15 percent by weight of a silicon-containing binder material, all percentages being based upon the total weight of the dry ingredients;
(c) heating said first particulate mixture either before or after step (b) to a temperature at which silica is reduced by aluminum to produce aluminum oxide and silicon; and
(d) heating said second particulate mixture either simultaneously with or after step (c) to a temperature at which a rigid, glassy cover layer is formed.

58. A method according to claim 57 wherein said silicon-containing binder material in said first particulate mixture is selected from the group consisting of sodium silicate, potassium silicate, ethyl silicate and colloidal silica.

59. A method according to claim 58 wherein said first particulate mixture comprises about 52.3 percent by weight mullite, about 10.4 percent by weight silica, about 26.7 percent by weight aluminum and about 9.6 percent by weight sodium silicate.

60. A method according to claim 57 wherein said silicon-containing binder material in said second particulate mixture is selected from the group consisting of sodium silicate, potassium silicate, ethyl silicate and colloidal silica.

61. A method according to claim 60 wherein said second particulate mixture comprises about 57.7 percent by weight mullite, about 11.0 percent by weight silica, about 20.3 weight percent by weight silicon carbide and about 10.6 percent by weight sodium silicate.

62. A method according to claim 57 wherein said first particulate mixture is applied to the surfaces of said carbonaceous article in the form of an aqueous slurry.

63. A method according to claim 62 wherein said slurry is dried under conditions to produce a hard coherent layer adhering to said carbonaceous article.

64. A method according to claim 63 wherein said slurry is dried in air at ambient temperature.

65. A method according to claim 63 wherein said dried coherent layer is heated to temperature of at least about 1000° C.

66. A method according to claim 63 wherein said second particulate mixture is applied to said first particulate mixture in the form of an aqueous slurry.

67. A method according to claim 66 wherein said slurry is dried under conditions to produce a hard coherent layer adhering to said first particulate mixture.

68. A method according to claim 67 wherein said slurry is dried in air at ambient temperature.

69. A method according to claim 67 wherein said dried coherent layer is heated to a temperature of at least about 1000° C.

70. A method according to claim 57 wherein a third particulate mixture is applied to said second particulate mixture, said third particulate mixture comprising from about 25 to about 85 percent by weight borosilicate frit, from about 5 to about 15 percent by weight silicon-containing binder material and 0 to about 65 percent by weight filler material, and wherein said third particulate mixture is heated to a temperature at which a rigid, glassy cover layer is formed.

71. A method according to claim 70 wherein said borosilicate frit comprises from about 7 to about 52 percent by weight $Na_2O$, from about 8 to about 64 percent by weight $B_2O_3$ and from about 6 to about 68 percent by weight $SiO_2$.

72. A method according to claim 70 wherein said silicon-containing binder material is selected from the group consisting of sodium silicate, potassium silicate, ethyl silicate and collodial silica.

73. A method according to claim 70 wherein said filler material is selected from the group consisting of $Al_2O_3$, SiC, mullite, $SiO_2$ and $B_4C$.

74. A method of protecting a carbonaceous article against oxidation and erosion at elevated temperatures, which comprises:
(a) applying to the surfaces of said carbonaceous article a first particulate mixture comprising from about 30 to about 75 percent by weight mullite, 0 to about 12 percent by weight silica, from about 15 to about 60 percent by weight aluminum and from about 5 to about 11 percent by weight of a silicon-containing binder material, all percentages being based upon the total weight of the dry ingredients;
(b) applying to said first particulate mixture a second particulate mixture comprising from about 25 to about 85 percent by weight borosilicate frit, from about 5 to about 15 percent by weight silicon-containing binder material and 0 to about 65 percent by weight filler material, all percentages being based upon the total weight of the dry ingredients;
(c) heating said first particulate mixture either before or after step (b) to a temperature at which silica is reduced by aluminum to produce aluminum oxide and silicon; and
(d) heating said second particulate mixture either simultaneously with or after step (c) to a temperature at which a rigid, glassy cover layer is formed.

75. A method according to claim 74 wherein said silicon-containing binder material in said first particulate mixture is selected from the group consisting of sodium silicate, potassium silicate, ethyl silicate and collodical silica.

76. A method according to claim 75 wherein said first particulate mixture comprises about 52.3 percent by weight mullite, about 10.4 percent by weight silica, about 26.7 percent by weight aluminum and about 9.6 percent by weight sodium silicate.

77. A method according to claim 74 wherein said borosilicate frit comprises from about 7 to about 52 percent by weight $Na_2O$, from about 8 to about 64 percent by weight $B_2O_3$ and from about 6 to about 68 percent by weight $SiO_2$.

78. A method according to claim 74 wherein said silicon-containing binder material is selected from the group consisting of sodium silicate, potassium silicate, ethyl silicate and collodical silica.

79. A method according to claim 74 wherein said filler material is selected from the group consisting of $Al_2O_3$, SiC, mullite, $SiO_2$ and $B_4C$.

80. A method according to claim 74 wherein said first particulate mixture is applied to the surfaces of said carbonaceous article in the form of an aqueous slurry.

81. A method according to claim 74 wherein said slurry is dried under conditions to produce a hard coherent layer adhering to said carbonaceous article.

82. A method according to claim 74 wherein said slurry is dried in air at ambient temperature.

83. A method according to claim 74 wherein said dried coherent layer is heated to a temperature of at least about 1000° C.

84. A method according to claim 74 wherein said second particulate mixture is applied to said first particulate mixture in the form of an aqueous slurry.

85. A method according to claim 84 wherein said slurry is dried under conditions to produce a hard coherent layer adherent to said first particulate layer.

86. A method according to claim 85 wherein said slurry is dried in air at ambient temperature.

87. A method according to claim 85 wherein said dried coherent layer is heated to a temperature of at least about 1000° C.

88. In an electric arc furnace for producing steel wherein an electric current is passed through a graphite electrode to establish an electric arc between the tip of said electrode and the molten metal, the improvement which comprises a graphite electrode having an oxidation prohibitive coating thereon, said coating comprising a base layer overlying and bonded to the surfaces of said graphite electrode, said base layer being composed of a compliant, low strength, porous, sintered, particulate, ceramic, refractory material containing mullite as a major ingredient, said material having a tensile strength which is substantially less than the shear strength of the interfacial bond between the base layer and said graphite electrode, and a cover layer overlying and bonded to said base layer comprising a rigid, glassy substance which is plastic and flowable at temperatures above about 750° C.

89. The improvement according to claim 88 wherein said base layer comprises mullite, aluminum oxide and silicon particles.

90. The improvement according to claim 89 wherein said particles are loosely bonded to one another with many void spaces between particles.

91. The improvement according to claim 89 wherein said base layer also comprises refractory fibers.

92. The improvement according to claim 91 wherein said refractory fibers comprise aluminum, silicon, nitrogen and oxygen.

93. The improvement according to claim 92 wherein said refractory fibers comprise a nitrous aluminosilicate compound.

94. The improvement according to claim 91 wherein said refractory fibers are arranged in clusters within said void spaces between said particle.

95. The improvement according to claim 91 wherein said base layer also comprises hollow aluminum oxide shells containing said refractory fibers.

96. The improvement according to claim 91 wherein said rigid, glassy layer comprises oxides of aluminum, sodium and silicon and metallic carbides of silicon or boron.

97. The improvement according to claim 88 wherein said rigid, glassy layer contains particles of mullite and silicon carbide.

98. An article according to claim 88 wherein said rigid, glassy layer comprises oxides of boron, sodium and silicon.

99. The improvement according to claim 91 wherein the bond between said base layer and said graphite electrode comprises refractory fibers formed in situ within the pores of the graphite.

100. The improvement according to claim 99 wherein said refractory fibers complete aluminum, silicon, nitrogen and oxygen.

101. The improvement according to claim 100 wherein said refractory fibers comprise a nitrous aluminosilicate compound.

102. In the production of steel within an electric arc furnace wherein an electric current is passed through a graphite electrode to establish an electric arc between the tip of said electrode and the molten metal, a process for protecting said electrode against oxidation and erosion at the operating temperatures of said furnace, which comprises:

(a) applying to said graphite electrode a protective coating comprising a base layer overlying and bonded to said electrode, said base layer being composed of a compliant, low strength, porous, sintered, particulate, ceramic refractory material containing mullite as a major ingredient, said material having a shear strength which is substantially less than the shear strength of the interfacial bond between said base layer and said graphite electrode and a cover layer overlying and bonded to said base layer comprising a rigid, glassy substance which is plastic and flowable at said operating furnace temperatures, said rigid, glassy cover layer having a co-efficient of thermal expansion which is substantially greater than that of said graphite electrode;

(b) heating said furnace and said coated electrode to said operating furnace temperatures;

(c) cooling said coated electrode to a temperature which is substantially lower than said operating furnace temperatures whereby said base and cover layers contract at a greater rate than said graphite electrode and produce in said layers a high tensile stress causing microcracks which extend in a direction toward the interface between said base layer and said graphite electrode; and (d) reheating the coated electrode to said operating furnace temperatures whereby said rigid, glassy cover layer is rendered plastic and flowable and seals off said microcracks prohibiting ingress of oxygen toward said graphite electrode.

* * * * *